United States Patent
Bera et al.

(10) Patent No.: US 10,713,053 B2
(45) Date of Patent: Jul. 14, 2020

(54) ADAPTIVE SPATIAL ACCESS PREFETCHER APPARATUS AND METHOD

(71) Applicant: Intel Corporation, Santa Clara, CA (US)

(72) Inventors: Rahul Bera, Bangalore (IN); Anant Vithal Nori, Bangalore (IN); Sreenivas Subramoney, Bangalore (IN); Hong Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 16/024,808

(22) Filed: Jun. 30, 2018

(65) Prior Publication Data

US 2019/0310853 A1 Oct. 10, 2019

Related U.S. Application Data

(60) Provisional application No. 62/654,298, filed on Apr. 6, 2018.

(51) Int. Cl.
*G06F 9/38* (2018.01)
*G06F 12/0875* (2016.01)
(Continued)

(52) U.S. Cl.
CPC ........ *G06F 9/3802* (2013.01); *G06F 12/0862* (2013.01); *G06F 12/0875* (2013.01);
(Continued)

(58) Field of Classification Search
None
See application file for complete search history.

(56) References Cited

U.S. PATENT DOCUMENTS 5,778,436 A * 7/1998 Kedem ............... G06F 12/0862
711/122
6,134,643 A * 10/2000 Kedem ............... G06F 12/0862
711/137
(Continued)

FOREIGN PATENT DOCUMENTS

EP 3285172 A1 2/2018
GB 2544474 A * 5/2017 ........... G06F 9/3806
(Continued)

OTHER PUBLICATIONS

'Data Cache Prefetching Using a Global History Buffer' by Nesbit et al., copyright 2005, IEEE. (Year: 2005).*
(Continued)

*Primary Examiner* — Steven G Snyder
(74) *Attorney, Agent, or Firm* — Nicholson De Vos Webster & Elliott LLP

(57) ABSTRACT

An apparatus and method for adaptive spatial accelerated prefetching. For example, one embodiment of an apparatus comprises: execution circuitry to execute instructions and process data; a Level 2 (L2) cache to store at least a portion of the data; and a prefetcher to prefetch data from a memory subsystem to the L2 cache in anticipation of the data being needed by the execution unit to execute one or more of the instructions, the prefetcher comprising a buffer to store one or more prefetched memory pages or portions thereof, and signature data indicating detected patterns of access to the one or more prefetched memory pages; wherein the prefetcher is to prefetch one or more cache lines based on the signature data.

18 Claims, 25 Drawing Sheets

(51) Int. Cl.
*G06F 12/0862* (2016.01)
*G06F 12/084* (2016.01)

(52) U.S. Cl.
CPC .... *G06F 12/084* (2013.01); *G06F 2212/1021* (2013.01); *G06F 2212/452* (2013.01); *G06F 2212/6022* (2013.01); *G06F 2212/6024* (2013.01)

(56) References Cited

U.S. PATENT DOCUMENTS

| | | | | |
|---|---|---|---|---|
| 7,539,844 | B1* | 5/2009 | Ekanadham | G06F 12/0862 711/137 |
| 7,657,729 | B2* | 2/2010 | El-Essawy | G06F 9/3455 712/240 |
| 8,161,264 | B2* | 4/2012 | Arimilli | G06F 12/0862 711/204 |
| 9,032,159 | B2* | 5/2015 | Ramani-Augustin | G06F 12/0862 711/137 |
| 9,274,965 | B2* | 3/2016 | El-Mahdy | G06F 12/0862 |
| 9,582,422 | B2* | 2/2017 | Yu | G06F 12/0862 |
| 9,886,385 | B1* | 2/2018 | Huberty | G06F 12/0862 |
| 9,971,695 | B2* | 5/2018 | Watahiki | G06F 12/0862 |
| 10,013,356 | B2* | 7/2018 | Chou | G06F 12/0862 |
| 10,248,569 | B2* | 4/2019 | Liu | G06F 12/0862 |
| 10,387,318 | B2* | 8/2019 | Hooker | G06F 9/383 |
| 10,445,241 | B2* | 10/2019 | Garcia | G06F 12/0862 |
| 2004/0243767 | A1* | 12/2004 | Cierniak | G06F 9/383 711/137 |
| 2006/0041722 | A1* | 2/2006 | Hakura | G06F 12/0862 711/137 |
| 2006/0041723 | A1* | 2/2006 | Hakura | G06F 12/0862 711/137 |
| 2006/0059311 | A1* | 3/2006 | Van De Waerdt | G06F 12/0862 711/137 |
| 2007/0088915 | A1* | 4/2007 | Archambault | G06F 8/4442 711/137 |
| 2008/0016330 | A1* | 1/2008 | El-Essawy | G06F 9/3455 712/225 |
| 2009/0177842 | A1* | 7/2009 | Kulkarni | G06F 9/383 711/125 |
| 2009/0198904 | A1* | 8/2009 | Arimilli | G06F 12/0862 711/137 |
| 2010/0153653 | A1* | 6/2010 | El-Mahdy | G06F 12/0862 711/137 |
| 2014/0006718 | A1* | 1/2014 | Ramani-Augustin | G06F 12/0862 711/137 |
| 2015/0134933 | A1* | 5/2015 | Holm | G06F 12/0862 712/207 |
| 2015/0143057 | A1* | 5/2015 | Pavlou | G06F 12/02 711/137 |
| 2015/0278099 | A1* | 10/2015 | Jain | G06F 12/0862 711/137 |
| 2016/0098349 | A1* | 4/2016 | Watahiki | G06F 12/0862 711/137 |
| 2016/0188476 | A1* | 6/2016 | Yu | G06F 12/0862 711/137 |
| 2016/0357677 | A1* | 12/2016 | Hooker | G06F 9/30047 |
| 2017/0010970 | A1* | 1/2017 | Chou | G06F 12/0862 |
| 2017/0123985 | A1* | 5/2017 | Hooker | G06F 12/0875 |
| 2017/0322885 | A1* | 11/2017 | Mukherjee | G06F 12/0862 |
| 2018/0046578 | A1* | 2/2018 | Liu | G06F 12/0862 |
| 2018/0089087 | A1 | 3/2018 | Chang et al. | |
| 2019/0205135 | A1* | 7/2019 | Nori | G06F 9/30047 |
| 2019/0278709 | A1* | 9/2019 | Garcia | G06F 12/0862 |

FOREIGN PATENT DOCUMENTS

| | | | | |
|---|---|---|---|---|
| JP | 2001188706 A | * | 7/2001 | ......... G06F 12/0862 |
| WO | WO-2004049169 A2 | * | 6/2004 | ......... G06F 12/0862 |

OTHER PUBLICATIONS

Bera, Rahul, "Adaptive Prefetch Filter to Mitigate Prefetcher Induced Pollution", Master of Technology, Department of Computer Science & Engineering, Indian Institute of Technology Kanpur, Jan. 3, 2017, 52 pages.

European Search Report and Search Opinion, EP App. No. 191606615, dated Aug. 12, 2019, 11 pages.

Shevgoor et al., "Efficiently prefetching complex address patterns", Proceedings of the 48th International Symposium on Microarchitecture, Micro-48, 2015, pp. 141-152.

* cited by examiner

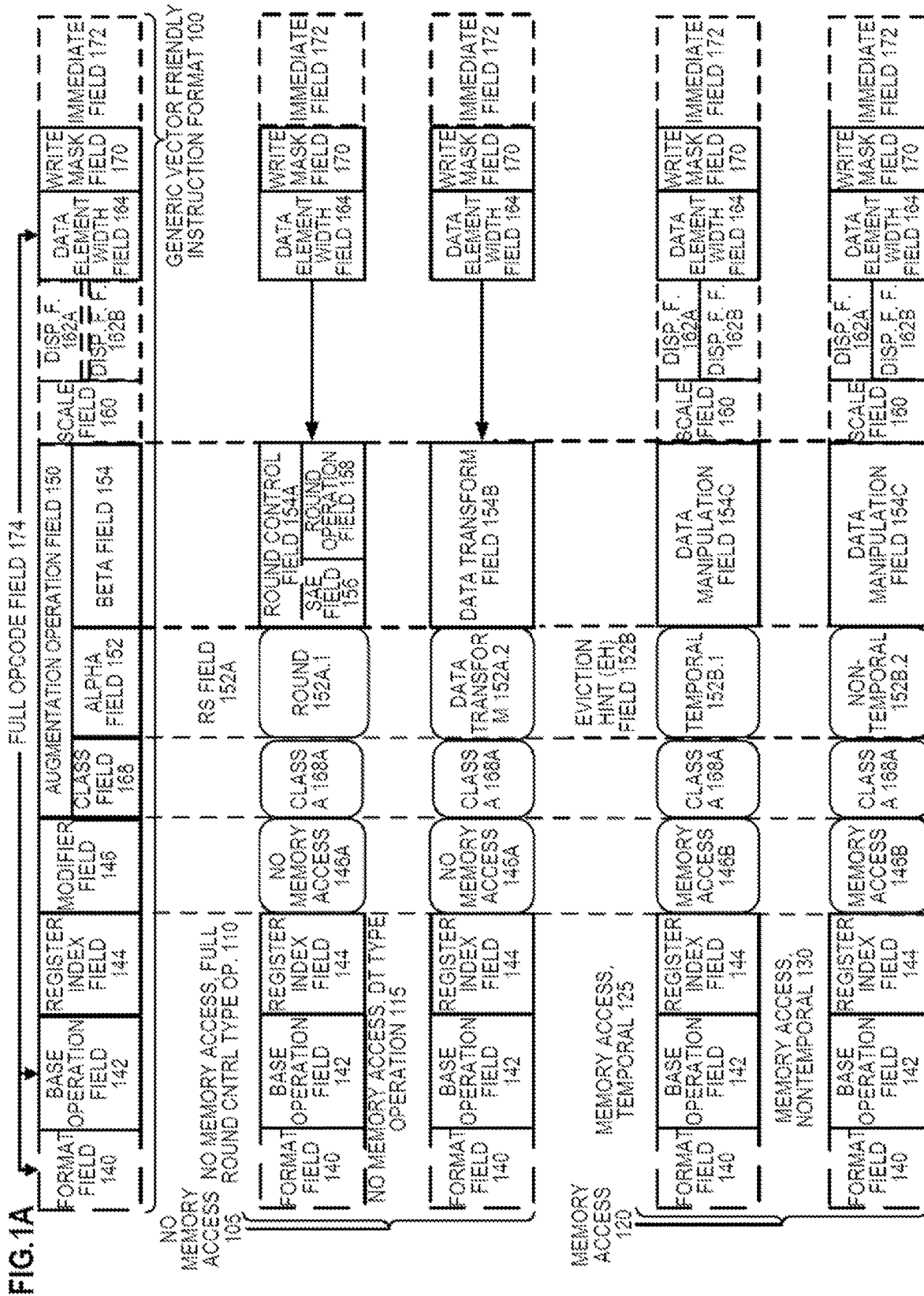

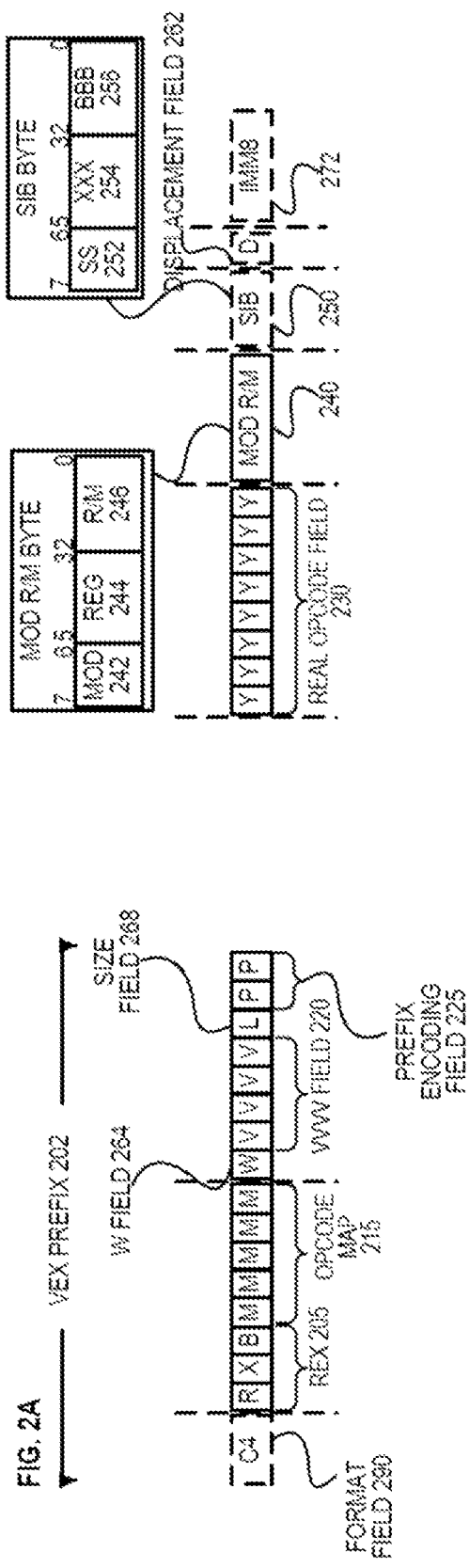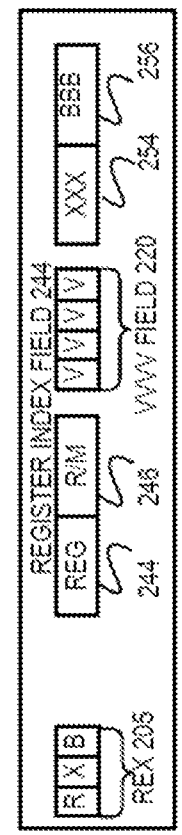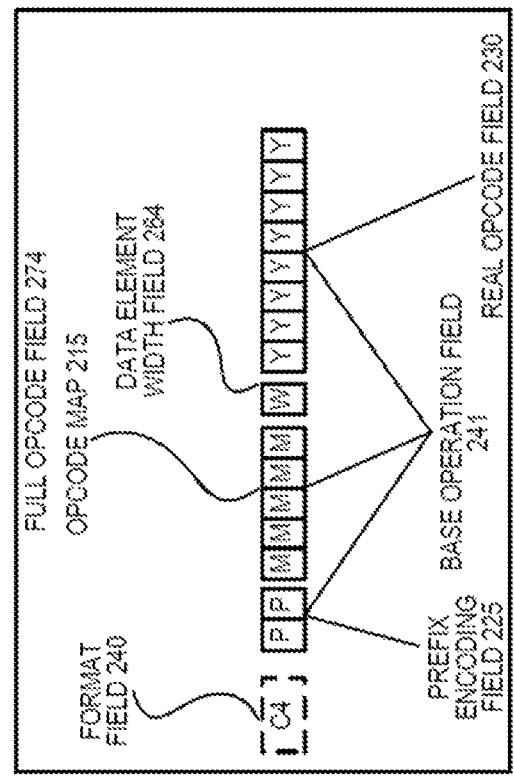

FIG. 3
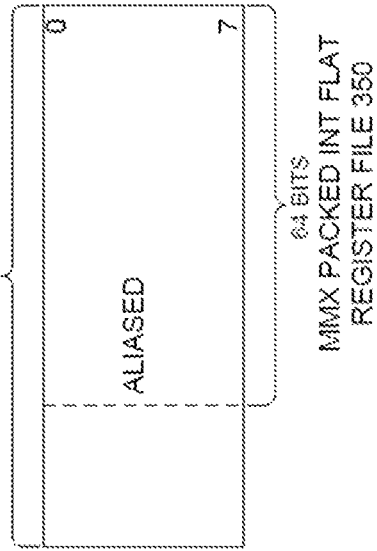
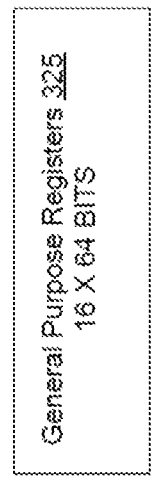
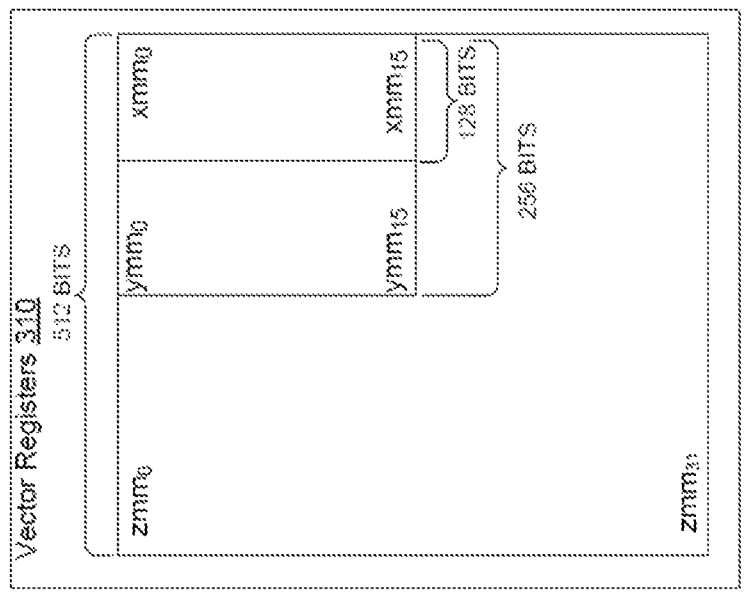

ADAPTIVE SPATIAL ACCESS PREFETCHER APPARATUS AND METHOD

CROSS REFERENCE TO RELATED APPLICATION

This application claims the benefit of U.S. Provisional Patent Application Ser. No. 62/654,298, filed Apr. 6, 2018, all of which is hereby incorporated herein by reference.

BACKGROUND

Field of the Invention

The embodiments of the invention relate generally to the field of computer processors. More particularly, the embodiments relate to an adaptive spatial access prefetcher apparatus and method.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIG. 3 is a block diagram of a register architecture according to one embodiment of the invention.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
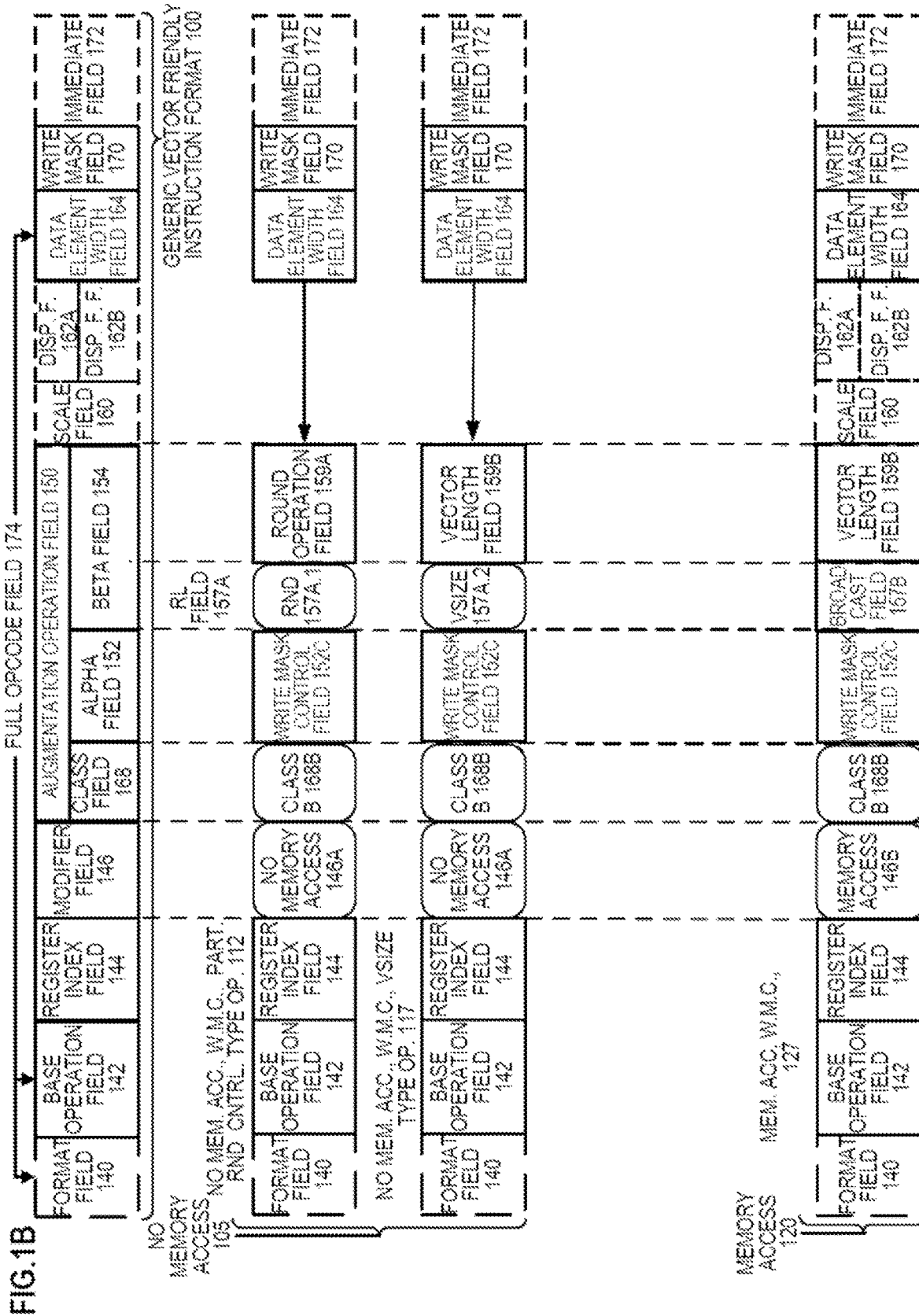

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}$*index+base).

Displacement Field 162A—its content is used as part of memory address generation (e.g., for address generation that uses $2^{scale}$*index+base+displacement).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
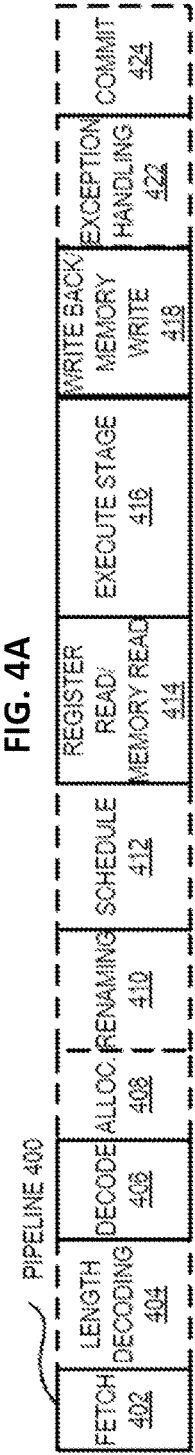
FIG. 4A is a block diagram illustrating both an exemplary in-order fetch, decode, retire pipeline and an exemplary register renaming, out-of-order issue/execution pipeline according to embodiments of the invention.
Figure 4B:
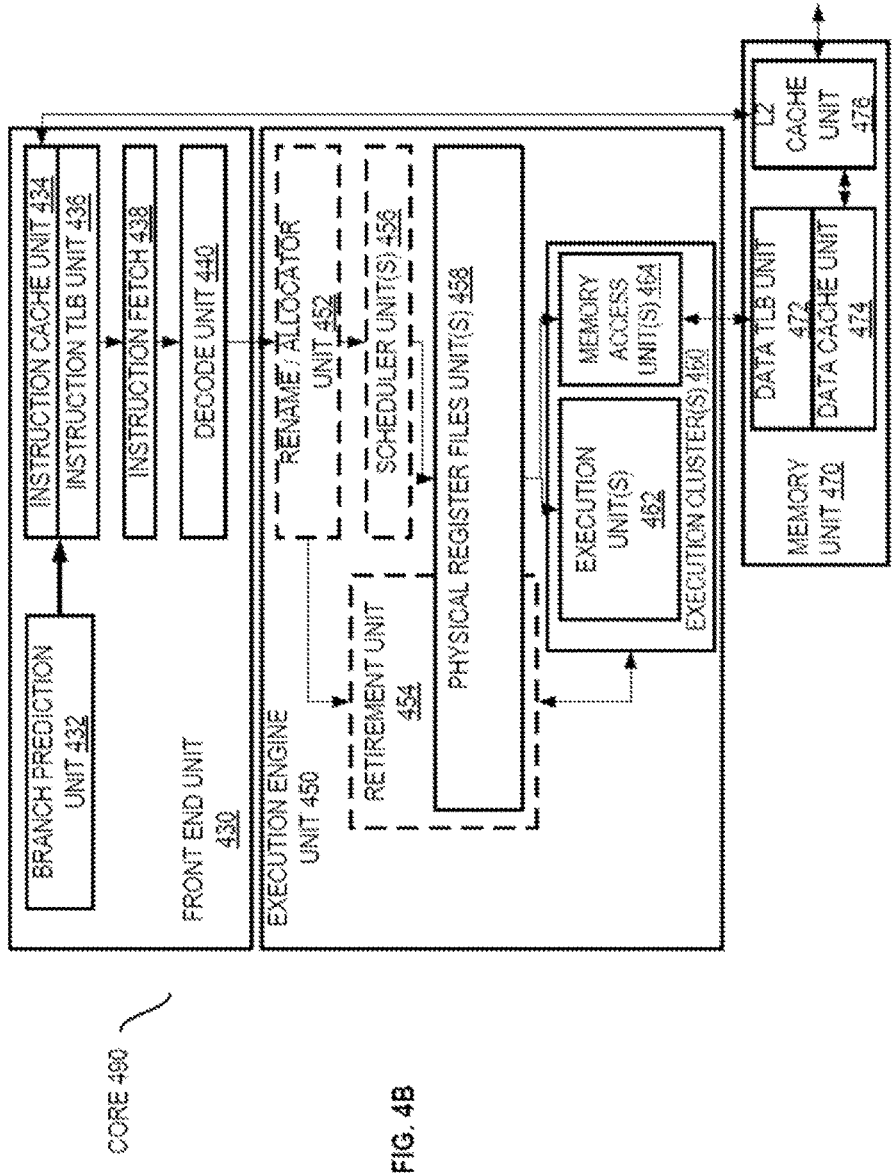
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 5B:
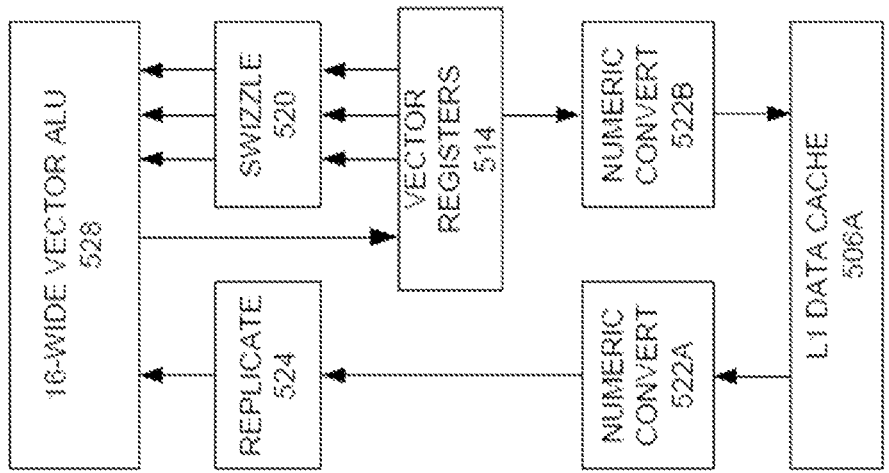
FIG. 5B illustrates an expanded view of part of the processor core in FIG. 5A according to embodiments of the invention.
Figure 5A:
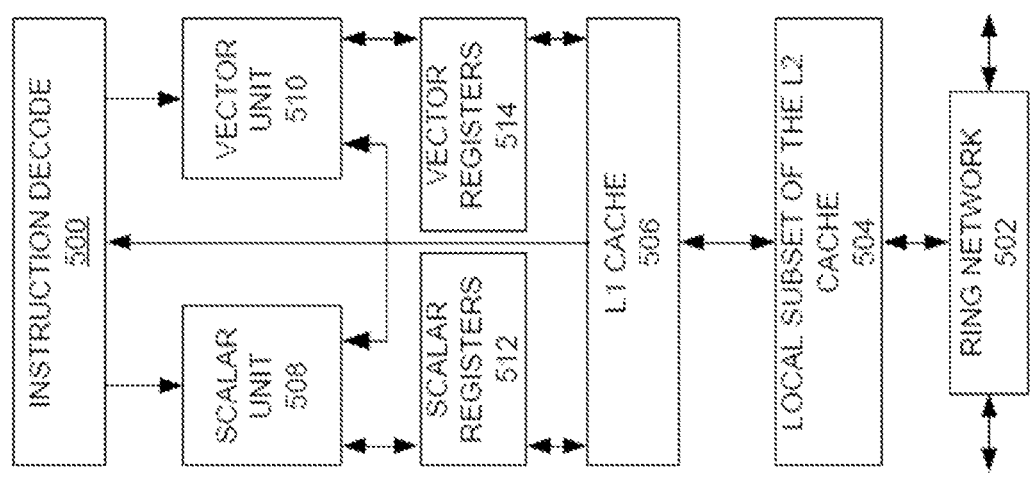
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
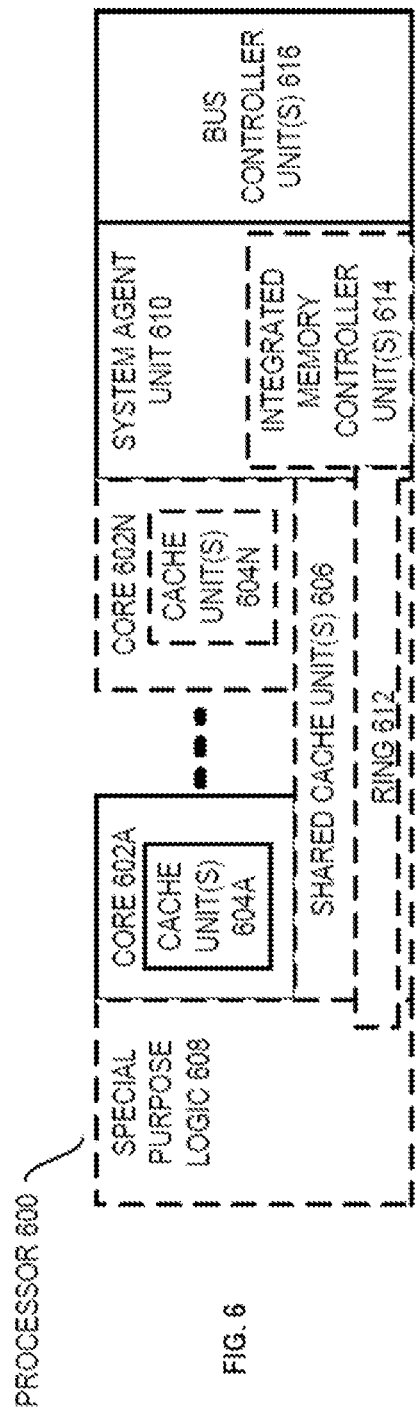
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
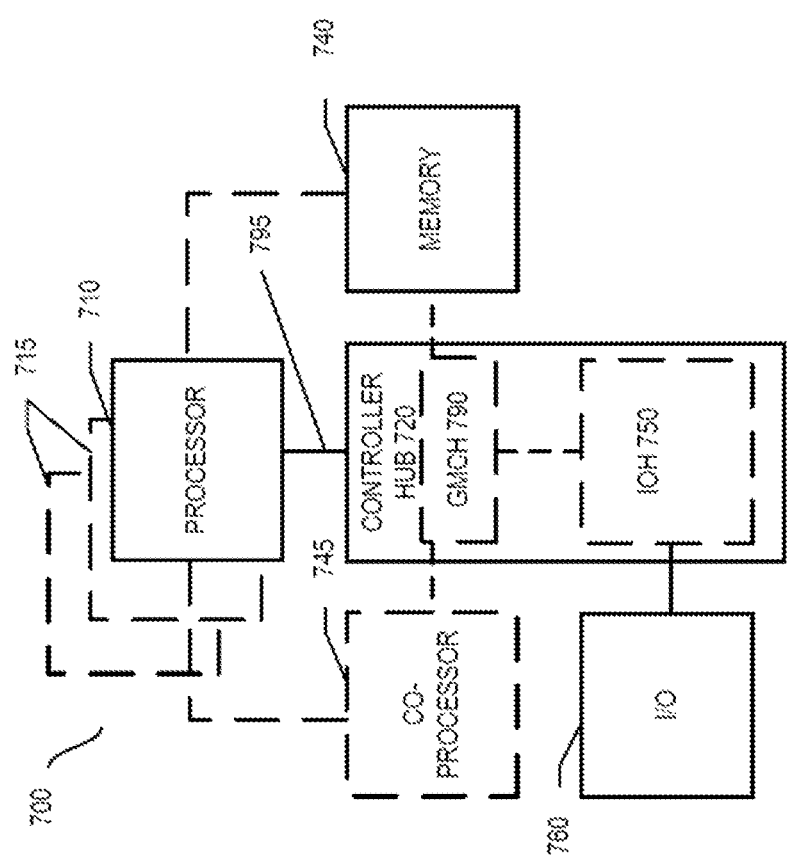
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
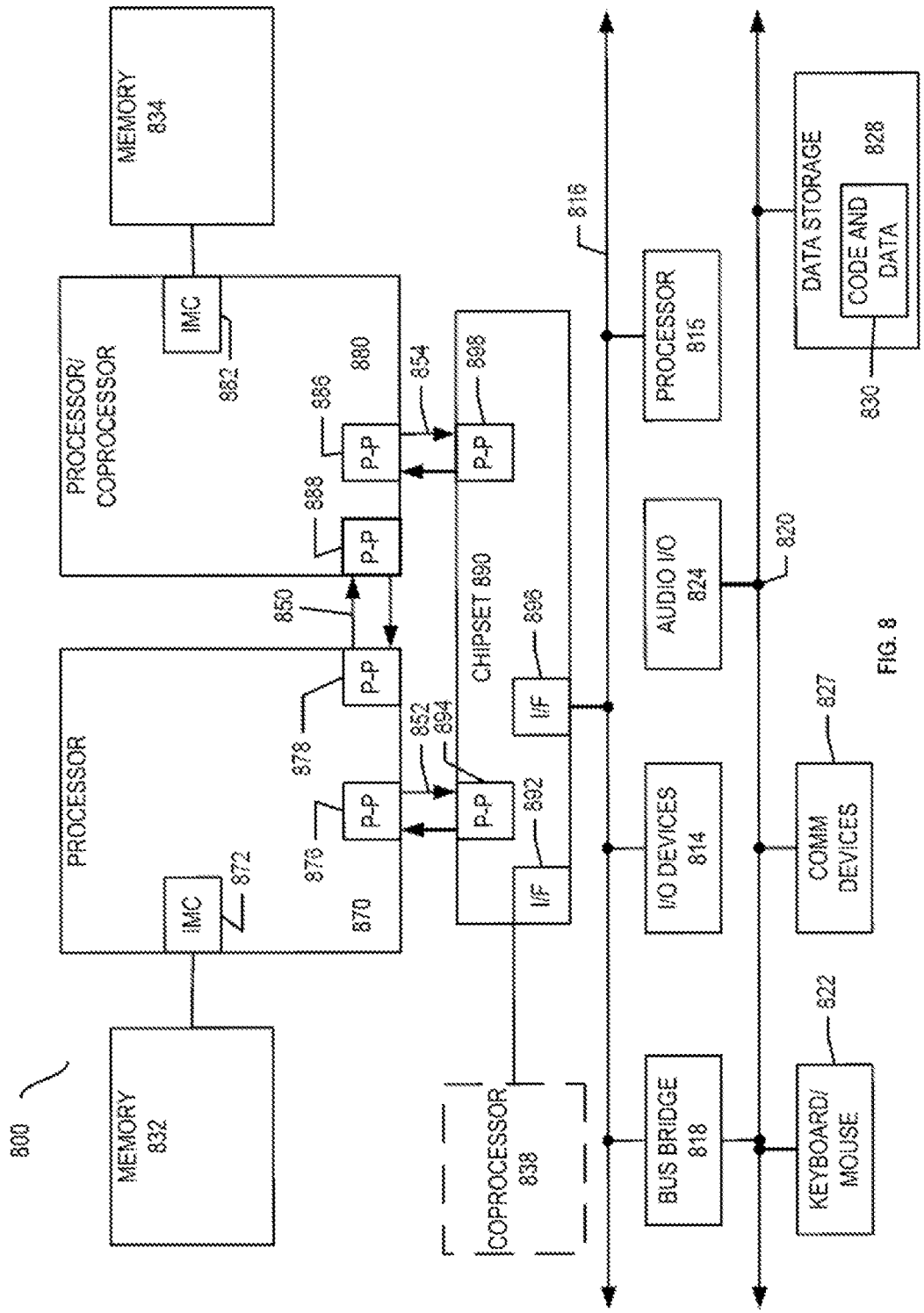
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
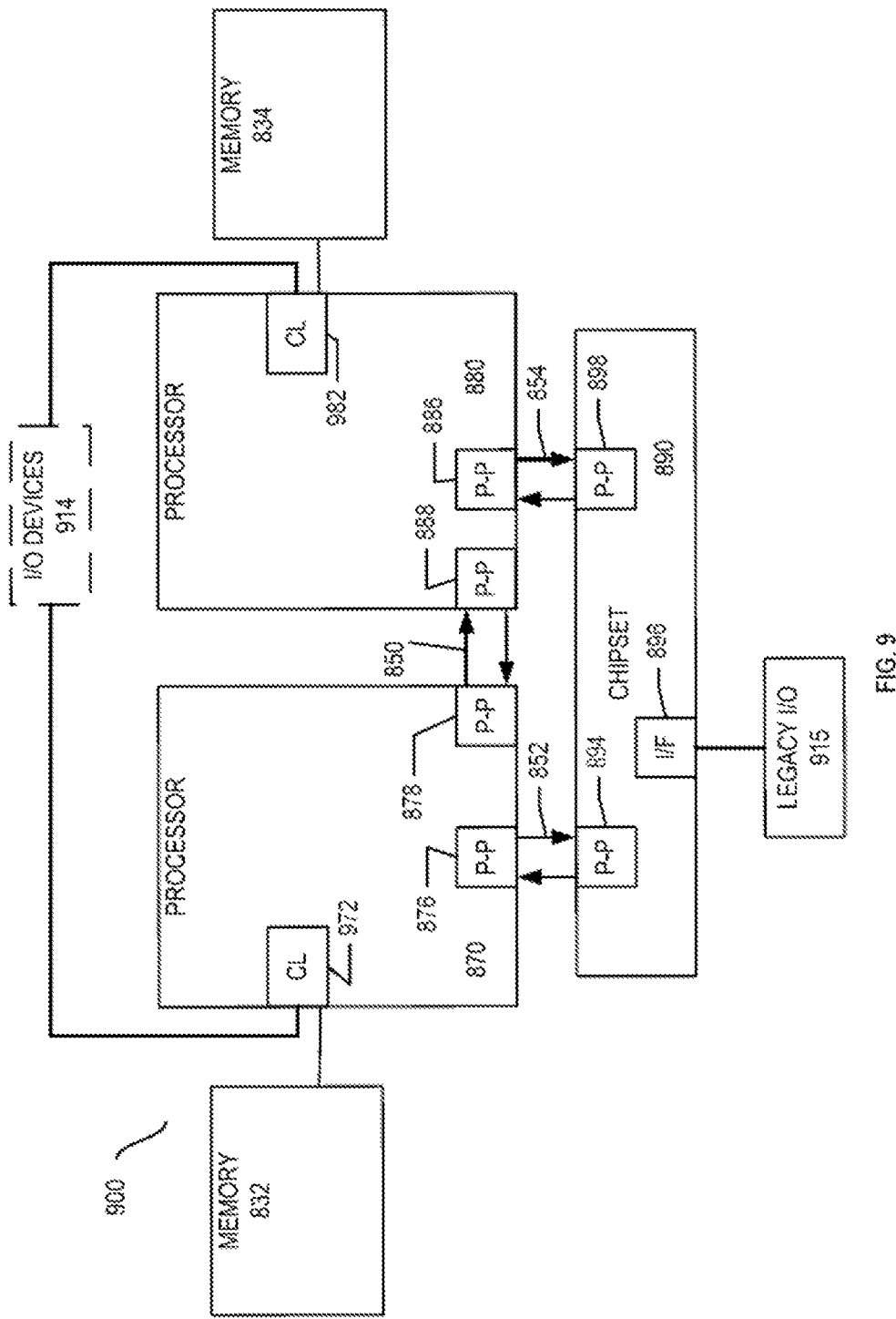
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
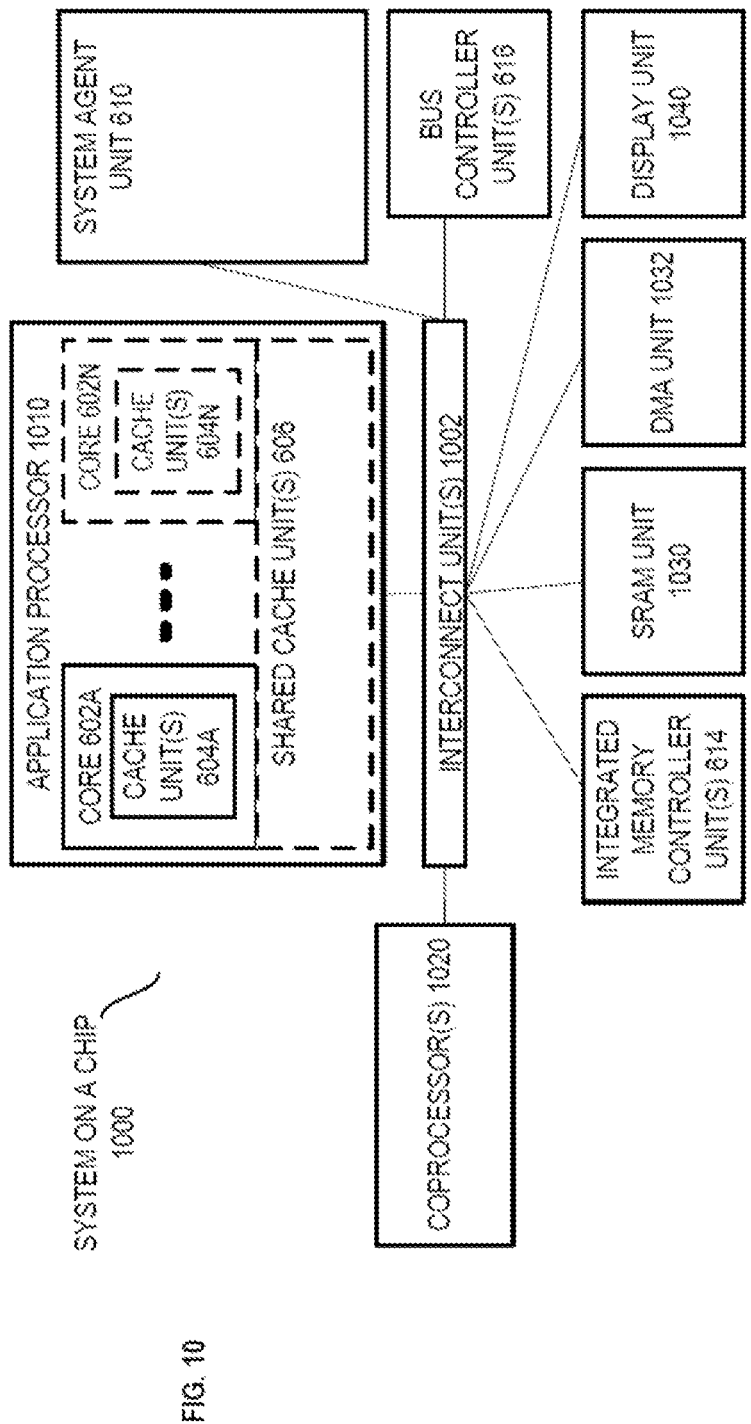
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
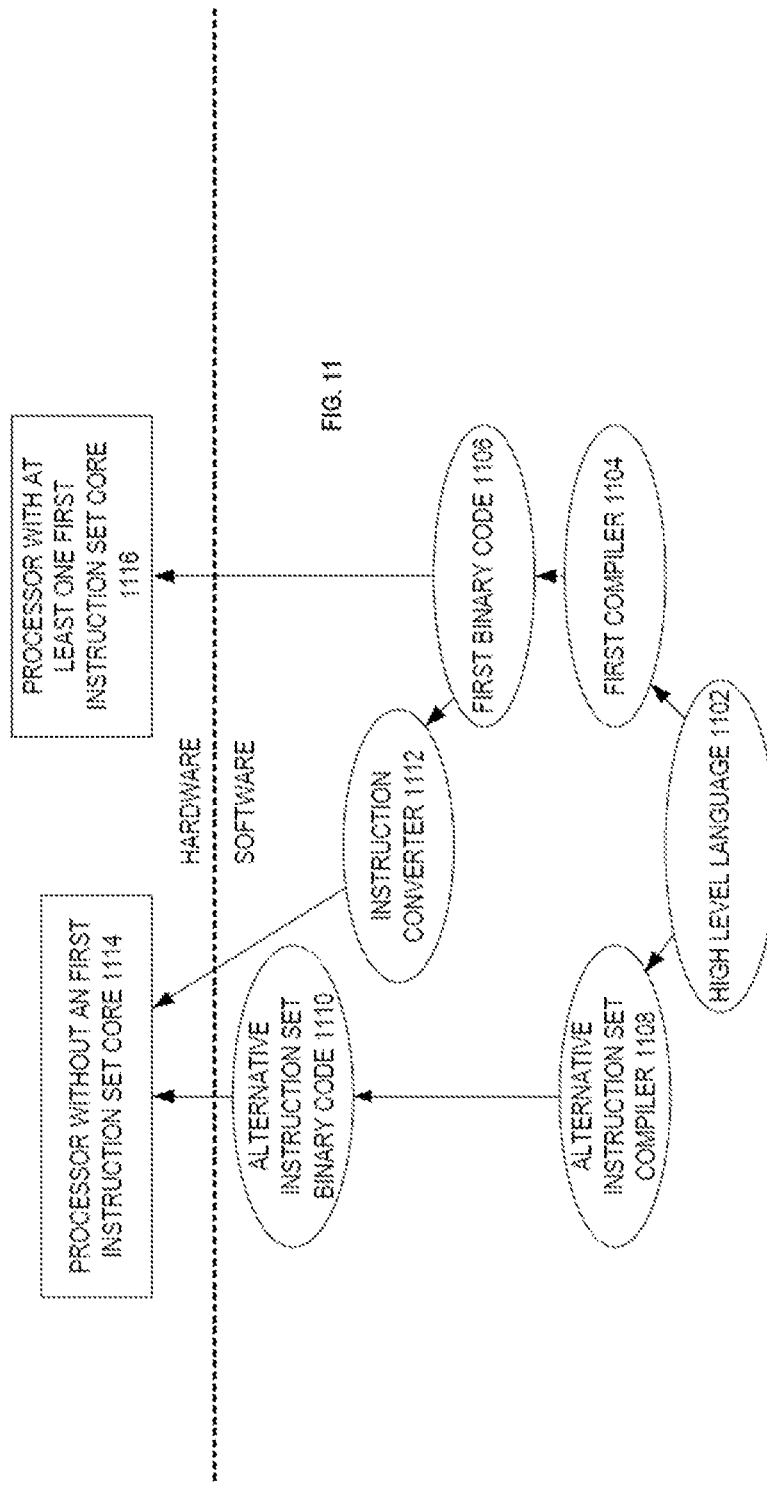
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Adaptive Spatial Access Prefetcher Apparatus and Method

When communicating with system memory such as a dynamic random access memory (DRAM) may be on the order of hundreds of processor clock cycles. This is larger than the latency tolerance of any modern high-performance processor and significantly limits performance (e.g., as measured by instructions retired per cycle (IPC)). Embodiments of the invention address this problem through a novel and efficient prefetcher, referred to herein as an adaptive spatial access prefetcher (ASAP). In one embodiment, the ASAP is configured at the L2 cache and is co-optimized for timeliness, coverage and area.

There are various solutions to the Memory Wall limit on performance. These include increasing processor depth which adds tolerance to higher latency (a complex and expensive approach with effectiveness reduced when increasing processor width as well), on-die caches with low access latencies (bound by capacity/area of cache) and prefetching or predicting addresses required by loads in a program (bound by the ability to predict a large portion of load addresses early). All modern high-performance employ a combination of some or all of these solutions.

One implementation employs prefetching to improve processor performance which involves predicting addresses that will be required by load operations in a program. Typically, processors will have both L1 and L2 prefetchers (to prefetch for L1 and L2 caches, respectively). The L1 prefetchers usually operate on program virtual addresses and instruction pointers (IPs) and aim to prefetch data from outer cache levels such as the L2 or LLC into the L1 in time for the processor loads. The L2 prefetchers operate on physical addresses (since the TLBs storing virtual-to-physical address translations are at the level of the L1) which attempt to prefetch long latency memory accesses into the larger L2/LLC caches.

Pertinent metrics for prefetching include Coverage, Accuracy, and Timeliness. Coverage indicates the extent to which accesses are correctly predicted by the prefetcher and may be expressed as a ratio of correct predictions over total accesses made by the program. This represents the number of higher latency accesses saved by the prefetcher. Accuracy may be expressed as a ratio of accesses correctly predicted/ accesses incorrectly predicted. Incorrectly predicted addresses cause cache pollution and increased pressure on the memory subsystem resources (e.g., bandwidth). Timeliness defines the extent to which prefetches are performed sufficiently in advance of when the data is requested. Timeliness may be enhanced by early triggering of prefetches at a large "distance" from the triggering access, saving/hiding a large portion of the high latency to memory and may have a significant impact on performance.

For prefetching at the L2 within a (typically) 4 KB physical page, the goal would be to predict all the correct/ relevant accesses to the page (maximizing coverage and accuracy) on the first access seen to the page at the L2 cache (maximizing timeliness). Moreover, this needs to be achieved under reasonable area/resource requirements of the prefetcher to enable efficient, high speed implementations. This requirement is directly addressed by the embodiments of the invention, including the ASAP prefetcher described herein.

Figure 12:
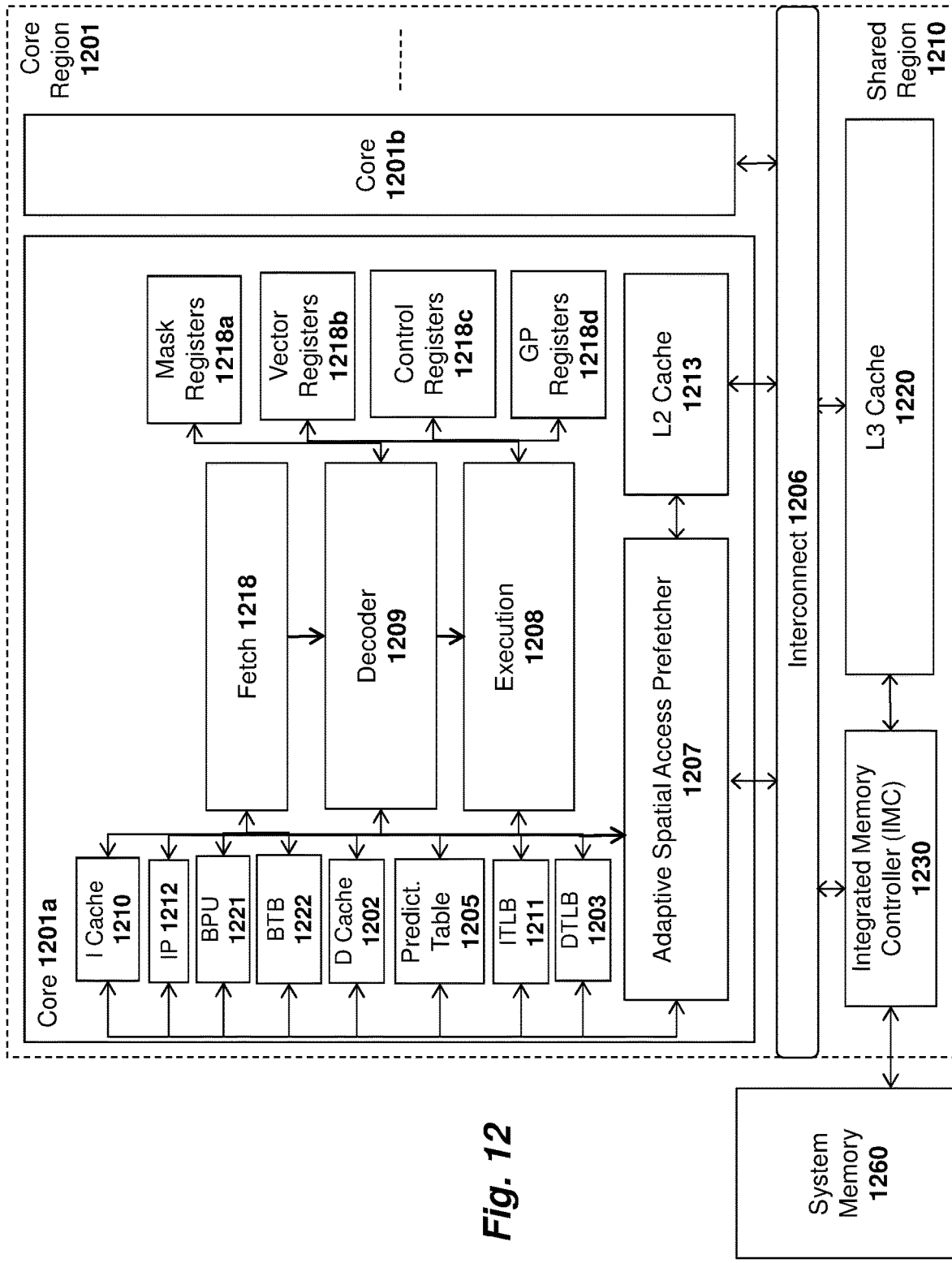
FIG. 12 illustrates a processor architecture on which embodiments of the invention may be implemented.

FIG. 12 illustrates an example processor architecture on which embodiments of the invention may be implemented. In particular, core 1201a includes an L2 prefetcher 1207 which implements the techniques described herein to prefetch data to the L2 cache 1213.

The illustrated architecture includes a core region 1201 and a shared or "uncore" region 1210. The shared region 1210 includes data structures and circuitry shared by all or a subset of the cores 1201a-b. In the illustrated embodiment, the plurality of cores 1201a-b are simultaneous multi-threaded cores capable of concurrently executing multiple instruction streams or threads. Although only two cores 1201a-b are illustrated in FIG. 12 for simplicity it will be appreciated that the core region 1201 may include any number of cores, each of which may include the same architecture as shown for Core 1201a. Another embodiment includes heterogeneous cores (e.g., low power cores combined with high power/performance cores).

The various components illustrated in FIG. 12 may be implemented in the same manner as corresponding components in FIGS. 1-11. For example, the core 1201a may execute instructions using one of the instruction formats in FIGS. 1a-b and 2a-c, and/or using the register architecture illustrated in FIG. 3. In addition, the cores 1201a may include the components of core 490 shown in FIG. 4b, and may include any of the processor/core components described herein (e.g., FIGS. 5a-b, FIG. 6, etc).

Each of the cores 1201a-b include instruction pipeline components for performing simultaneous, out-of-order (or in-order) execution of instruction streams including instruction fetch circuitry 1218 which fetches instructions from system memory 1260 or the L1 instruction cache 1210 and decode circuitry 1209 which decodes the instructions. Execution circuitry 1208 executes the decoded instructions to perform the underlying operations, as specified by the instruction operands, opcodes, and any immediate values.

Also illustrated in FIG. 12 are general purpose registers (GPRs) 1218d, a set of vector registers 1218b, a set of mask registers 1218a, and a set of control registers 1218c. In one embodiment, multiple vector data elements are packed into each vector register 1206 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1207 include eight 64-bit operand mask registers used for performing bit masking operations on the values stored in the vector registers 1206 (e.g., implemented as mask registers k0-k7 described above). However, the underlying principles of the invention are not limited to any particular mask register size/type.

The control registers 1218c store various types of control bits or "flags" which are used by executing instructions to determine the current state of the processor core 1201a. By way of example, and not limitation, in an x86 architecture, the control registers include the EFLAGS register.

An interconnect 1206 such as an on-die interconnect (IDI) implementing an IDI/coherence protocol communicatively couples the cores 1201a-b (and potentially an MPU accelerator 1201d) to one another and to various components within the shared region 1210. For example, the interconnect 1206 couples core 1201a via interface 1207 to a level 3 (L3)

cache and an integrated memory controller 1230 which couples the processor to a system memory 1260.

The integrated memory controller 1230 provides access to a system memory 1260 when performing memory operations (e.g., such as a MOV from system memory 1260 to a register). One or more input/output (I/O) circuits (not shown) such as PCI express circuitry may also be included in the shared region 1210.

An instruction pointer register 1212 stores an instruction pointer address identifying the next instruction to be fetched, decoded, and executed. Instructions may be fetched or prefetched from system memory 1260 and/or one or more shared cache levels such as an L2 cache 1213, the shared L3 cache 1220, or the L1 instruction cache 1210. In addition, an L1 data cache 1202 stores data loaded from system memory 1260 and/or retrieved from one of the other cache levels 1213, 1220 which cache both instructions and data. An instruction TLB (ITLB) 1211 stores virtual address to physical address translations for the instructions fetched by the fetch circuitry 1218 and a data TLB (DTLB) 1203 stores virtual-to-physical address translations for the data processed by the decode circuitry 1209 and execution circuitry 1208.

FIG. 12 also illustrates a branch prediction unit 1221 for speculatively predicting instruction branch addresses and branch target buffers (BTBs) 1222 for storing branch addresses and target addresses. In one embodiment, a branch history table (not shown) or other data structure is maintained and updated for each branch prediction/misprediction and is used by the branch prediction unit 1202 to make subsequent branch predictions.

Note that FIG. 12 is not intended to provide a comprehensive view of all circuitry and interconnects employed within a processor. Rather, components which are not pertinent to the embodiments of the invention are not shown. Conversely, some components are shown merely for the purpose of providing an example architecture in which embodiments of the invention may be implemented.

There is has been extensive work on prefetching in both industry and academia over the years. Prefetchers with the highest impact and relevant for comparison with ASAP are: the Streamer Prefetcher, Spatial Memory Streamer (SMS), and Signature Path Prefetch (SPP). The above prefetchers make trade-offs between resource complexity, timely coverage, and accuracy. Which results in each of them having a disadvantage or being sub-optimal in some ways.

The Streamer Prefetcher looks for a directional trend and issues prefetches a fixed distance (8 or 16 cachelines) away from the triggering access. It does not efficiently capture non-uniform (non-streaming) access patterns to a page and is highly inaccurate in a number of cases. SMS associates a signature (triggering PC and offset to a page) with an entire 64 bit pattern of subsequent accesses to the page. While more accurate and timely than Streamer prefetchers, SMS still has some major drawbacks related to area and coverage/accuracy.

The SPP is the current L2 prefetcher capable of dealing with complex non-uniform access patterns in a page. Timeliness of prefetches however is limited. Without the use of a triggering PC, it has a limited mechanism for triggering prefetches on the first access to the page. It achieves prefetch distance on subsequent accesses through a series of recursive predictions, each of lower confidence or accuracy, finally bound by a lower limit on confidence. This again puts a limit on prefetch timeliness One embodiment of the L2 prefetcher 1207 described herein optimizes timeliness, coverage, accuracy and area for physical address prefetching at the L2 cache 1213. In one embodiment, storage requirements of data patterns are decoupled from signatures, resulting in significant storage savings which can be fed back into increasing coverage and timeliness. In addition, the L2 prefetcher 1207 simultaneously optimizes both timeliness and coverage since prefetches to all subsequent accesses in a page are generated at the earliest of multiple trigger points. These embodiments also introduce techniques to systematically increase in coverage by trading off accuracy for more performance.

One embodiment of the invention achieves this by judiciously and systematically compressing prefetch patterns from a 64B granularity (for predicted cachelines) to some multiple of 64B, such as a 128B granularity (e.g., predicting 2 consecutive cachelines) or a 256B granularity (e.g., using a 16b pattern). The signature stores a 2-bit mode to decode the granularity of the prediction. For 128B granularity, for example, a 64b pattern may be compressed to a 32b pattern, represented by 2*8b pattern bank index. Note, however, that the underlying principles of the invention are not limited to 64B and multiples thereof. For example, prefetches using 8B, 16B, 32B, and multiples thereof may be used.

Figure 13:
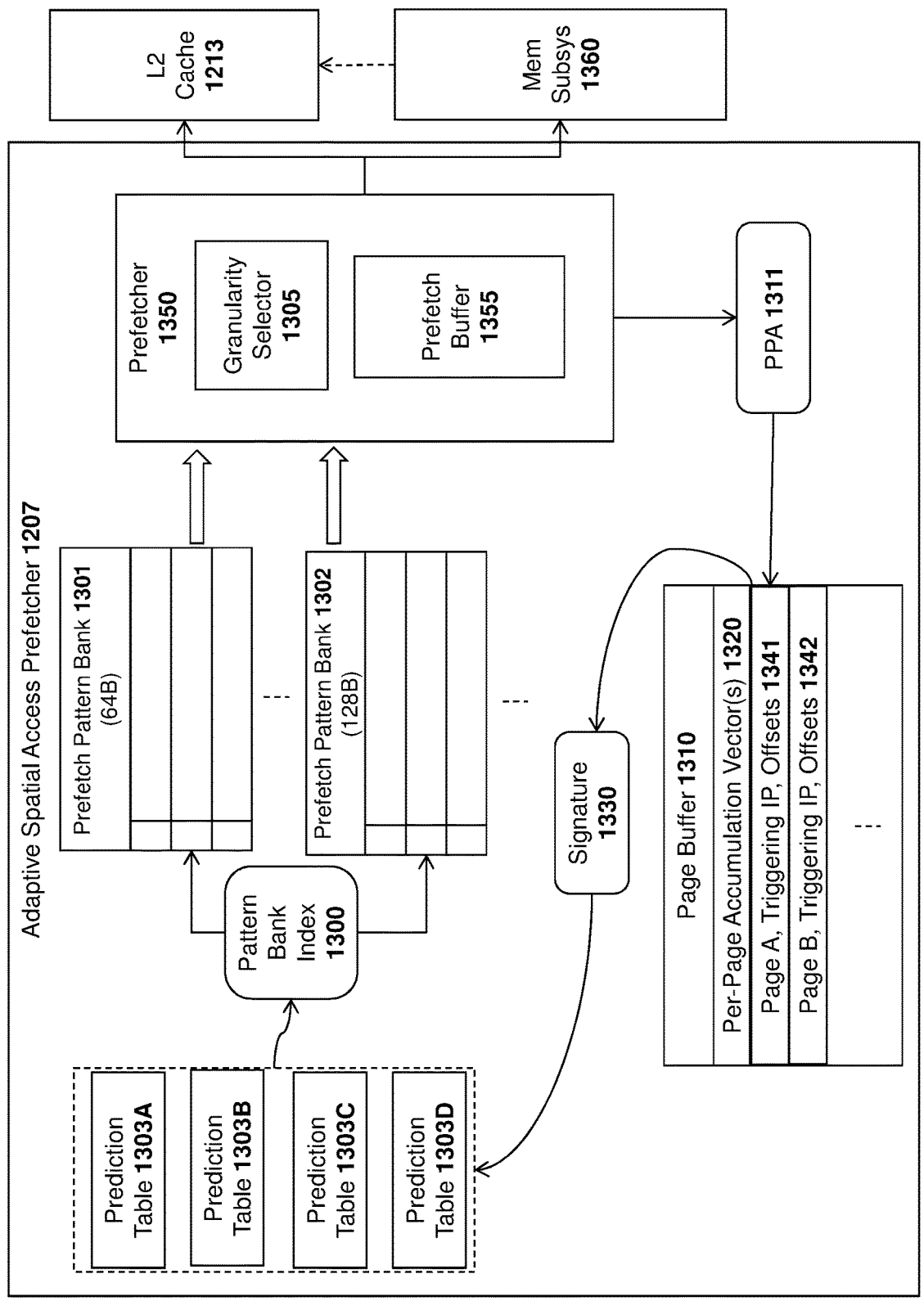
FIG. 13 illustrates one embodiment of a prefetcher including a page buffer, prediction tables and prefetch pattern banks.

As illustrated in FIG. 13, in one embodiment, a granularity selector 1305 determines the current granularity to be used for prefetching by the ASAP 1207 based on hit rates for one or more prefetch pattern banks 1301-1302. In one implementation, the prefetch pattern banks include a 64B prefetch pattern bank 1301 and a 128B pattern bank 1302, each with 256 entries. However, the underlying principles of the invention are not limited to any specific number of bytes or entries.

In one embodiment, each of the two pattern banks 1301-1302 are organized as a 32 set, 8 way associative structure. In this embodiment, the 64B pattern bank 1301 may store 32b patterns and the 128B pattern bank 1302 may store 32b patterns compressed into a 16b pattern.

One embodiment of the ASAP prefetcher 1207 also includes a 64-entry page buffer 1310 organized as a first-in-first-out (FIFO) buffer and indexed by the physical page address (PPA) 1311. This structure includes an accumulation vector 1320 which, in one embodiment is a 64-bit vector that accumulates the pattern of accesses seen in each page. Additionally, to create the signature 1330 into which the pattern is mapped, one embodiment stores the triggering instruction pointer (IP), and the first six offsets to each page 1341-1342.

A plurality of prediction tables 1303A-D are used in one embodiment, each of which includes 18 bits of data to index one of the prefetch pattern banks 1301-1302. The first 2 bits identify the mode (e.g., Mode1=64B pattern bank 1301, Mode2=128B pattern bank 1302 granularity, Mode3=256B granularity bank (not shown), etc). The next 16 bits identify the pattern and may be used as an index to the identified prefetch pattern bank 1301-1302. For 64B granularity, for example, this may include two 8b indices into the 64B prefetch pattern bank 1301 and for 128B granularity, this may include two 8b indices into the 128B prefetch pattern bank 1302. If a 256B prefetch pattern bank is used, a 16b direct compressed pattern may be used.

In one embodiment, the adaptive spatial access prefetcher 1207 uses the following four tables, each of which are set associative with 16 ways (with sets determined by the size):
1. First access table 1303A—256 entries—Signature=IP+Offset at 1 KB granularity;
2. Second access table 1303B—512 entries—Signature=IP+Offset at 1 Kb granularity+Delta between first 2 accesses;

3. Third/fourth/fifth access table 1303C—512 entries—Signature=Triggering offset+deltas between accesses (12 bit, compressed like SPP)
4. Sixth access table 1303D—256 entries—Signature=Deltas between first 6 accesses (12b signature).

Finally, the illustrated embodiment includes a prefetch buffer 1355 for storing two 64b bit-vectors for generated and issued prefetches for cache lines prefetched from the memory subsystem 1360 and stored in the L2 cache 1213 under the control of the prefetch circuitry 1350. In one embodiment, a granularity selector 1305 controls the granularity at which cache lines are prefetched in response to hit rates of each of the prefetch pattern banks 1301-1302. In one embodiment, the prefetch buffer 1355 includes 16 entries, although the underlying principles of the invention are not limited to any particular number of prefetch buffer entries.

Figure 14:
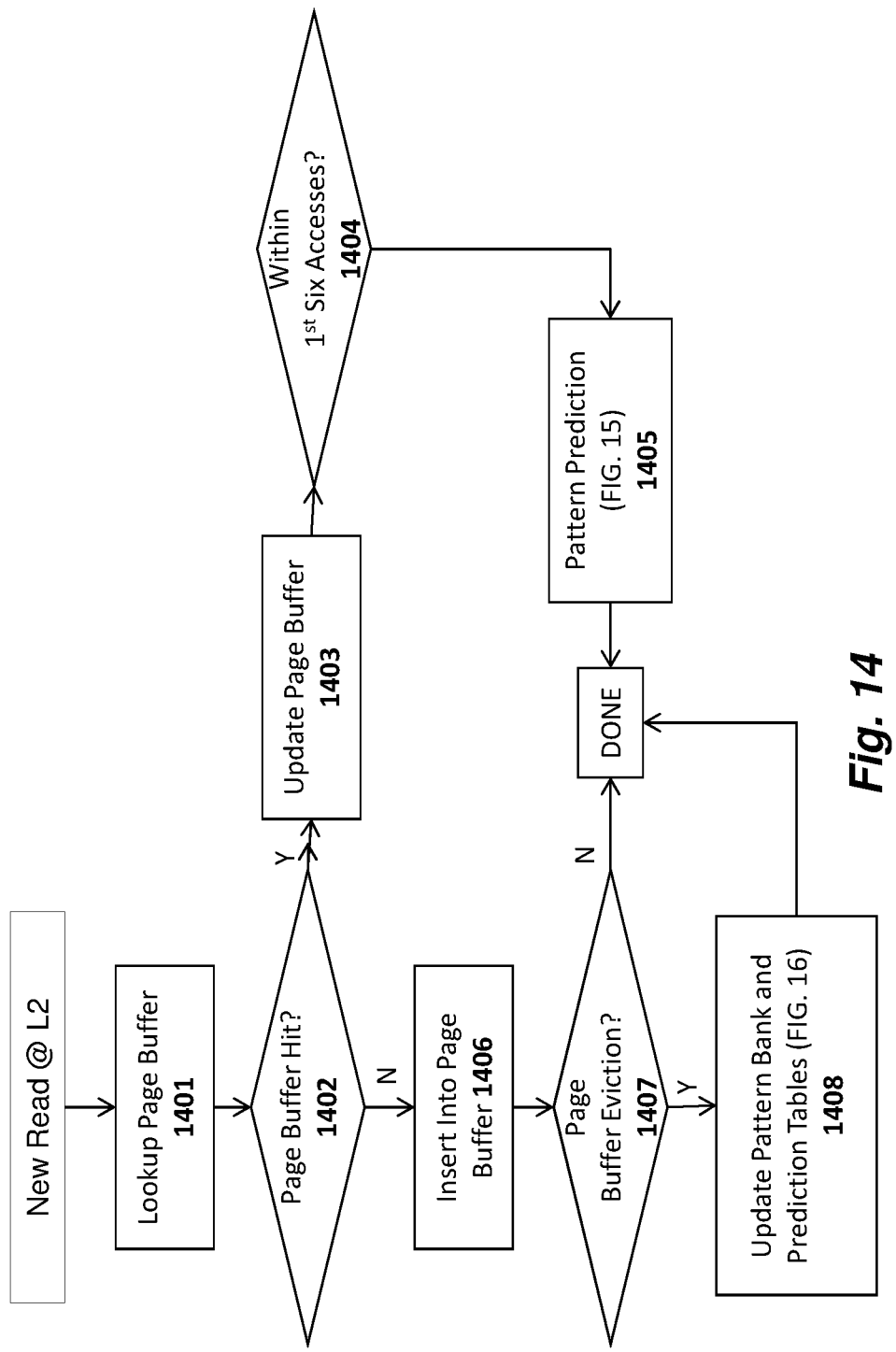
FIG. 14 illustrates one embodiment of a method for prefetching.

A process in accordance with one embodiment of the invention is illustrated in FIG. 14. The process may be implemented on the architectures described above but is not limited to any particular processor or system architecture.

Figure 15:
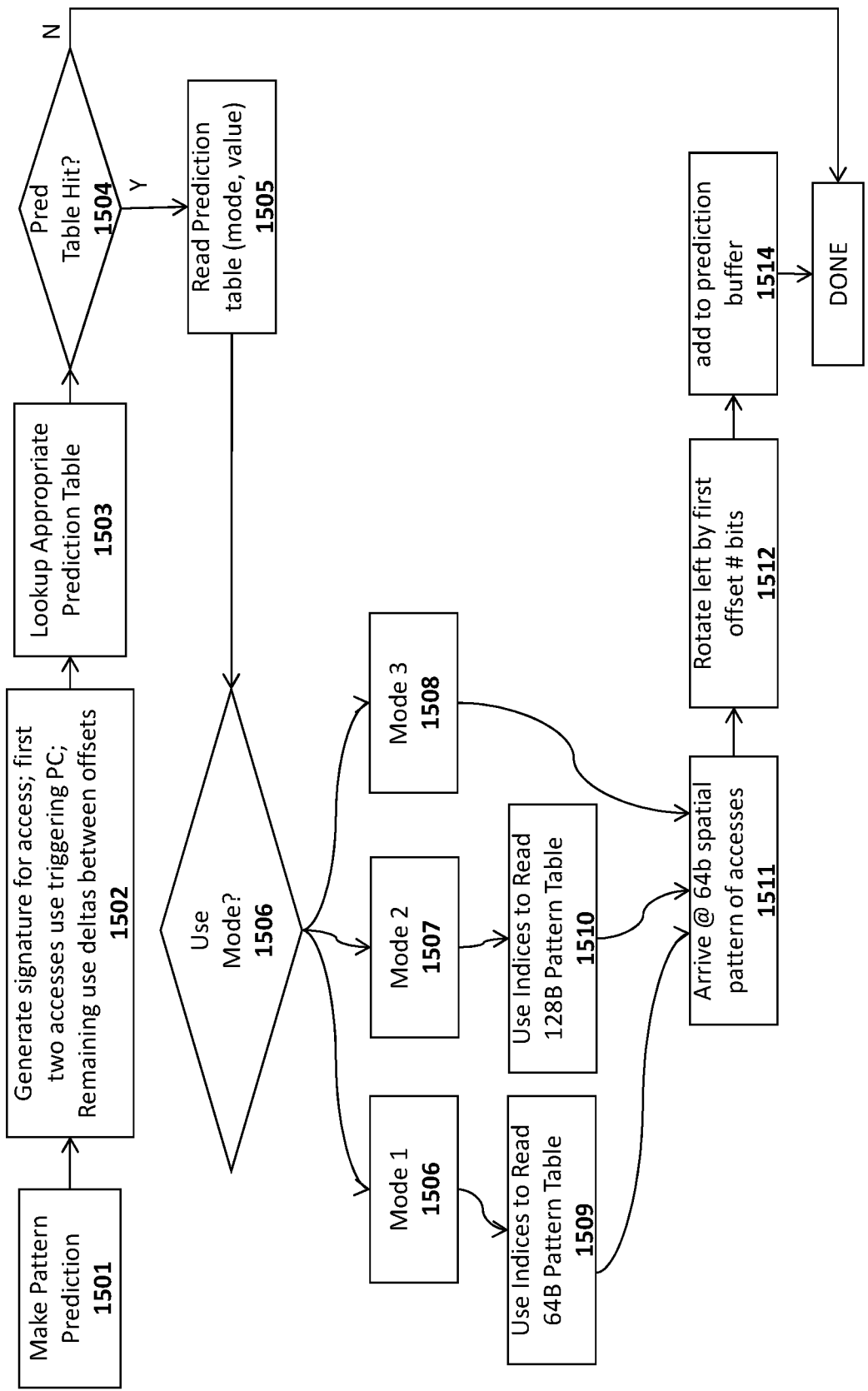
FIG. 15 illustrates one embodiment of a method for performing pattern prediction.

A new read to the L2 cache performs a lookup in the page buffer. If the page is already in the page buffer, determined at 1402, the page buffer entry is updated at 1403 (i.e., the 64b bit-vector, offsets into the page, etc). As mentioned, the first six accesses make predictions. Thus, if within the first six accesses, determined at 1404, then the pattern prediction is performed at 1405 (a detailed embodiment is shown in FIG. 15). If the page is not in the page buffer at 1402, then it is inserted into the page buffer at 1406. Insertion into the page buffer can result in an eviction for another page, determined at 1407. In response to an eviction, the pattern bank and prediction tables are updated at 1408 (with a detailed embodiment illustrated in FIG. 16). For example, the evicted entry may use its 64b bit vector and offsets to update the pattern banks and prediction tables.

FIG. 15 illustrates an exemplary method for pattern prediction. In response to a determination to perform a pattern prediction at 1501 (e.g., from 1405 in FIG. 14), a signature for access is generated at 1502. As mentioned, the first two accesses may use the triggering program counter (PC) value (e.g., the address of the instruction triggering the operation), while the remaining accesses also use deltas between offsets (as previously described). Using the signature, a appropriate prediction table is indexed at 1503 (e.g., one of the prediction tables 1303A-D). If there is a prediction table hit, determined at 1504, then the prediction table is read to identify the particular mode and prefetch pattern bank to be used (e.g., one of the 64B, 128B, 256B pattern banks for Modes 1, 2, and 3, respectively) and the pattern bank index to identify an entry in the selected pattern bank. The particular Mode, determined at 1506, may include Mode 1 1506 (e.g., using 16b=2*8 bit 64B index for a 64B pattern bank), Mode 2 1506 (e.g., using 16b=2*8 bit 128B index for a 128B pattern bank), and Mode 3 (e.g., using 16b=compressed 256B representation for a 256B pattern bank).

Regardless of which pattern bank is selected, in one embodiment, the end result is a 64b spatial pattern of accesses at 1511, which may be rotated left by a first offset number of bits at 1512 and added to the prediction buffer at 1514 (i.e., to be used by prefetch circuitry to prefetch cache lines based on the pattern of accesses).

Figure 16:
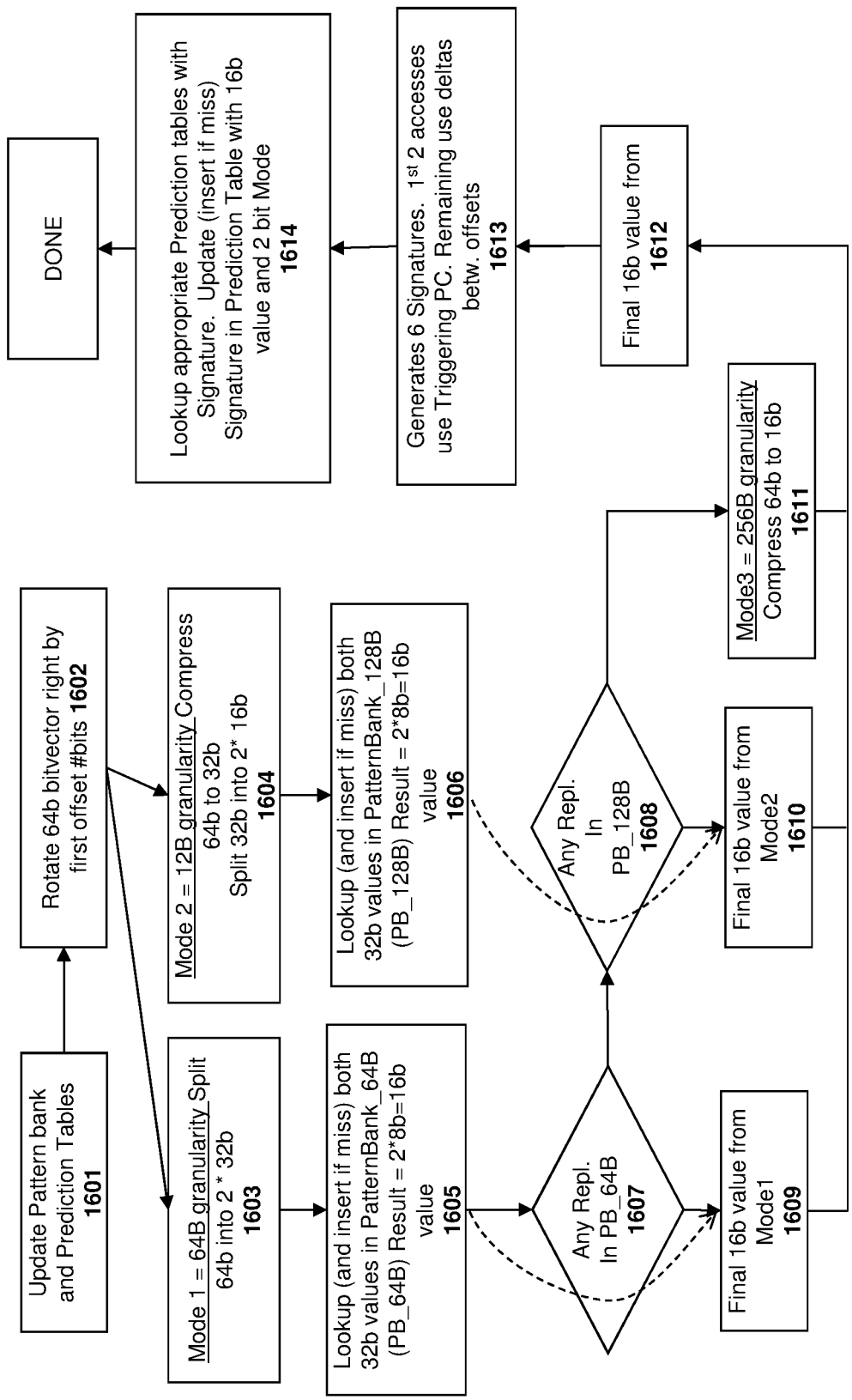
FIG. 16 illustrates one embodiment of a method for updating a pattern bank and prediction tables.

FIG. 16 illustrates one embodiment of a method for updating one of the pattern banks in response to a page buffer eviction (e.g., at 1408 in FIG. 14). In response to a decision to update the pattern bank at 1601, the 64b bit-vector is rotated right by a first offset number of bits at 1602.

For a Mode 1 operation (64B granularity), the 64b bit vector is split into two 32b portions at 1603 and a lookup is performed on the 64B pattern bank using both 32b values at 1605, resulting in 2*8b or 16b value. Similarly, at 1604, for a Mode 2 operation (128B granularity), the 64b bit vector is compressed to 32b and the 32b vale is split into two 16b values. portions at 1603 and a lookup is performed on the 64B pattern bank using both 32b values at 1605, resulting in 2*8b or a 16b value.

The final 16b value is generated from Mode 1 at 1609, depending on whether there is a replacement in the 64B pattern bank at 1607. Similarly, the final 16b value is generated from Mode 2 at 1610, depending on whether there is a replacement in the 128B pattern bank at 1608. Depending on the outcome, a Mode 3 64b bit vector for the 256B granularity pattern bank is compressed to 16b at 1611.

Thus, a final 16b value is produced at 1612 and signatures are generated at 1613. As mentioned, the first two accesses may use the triggering PC value and the remaining accesses may use deltas between offsets. At 1614, a lookup using the signature is performed to the appropriate prediction/signature tables and the signature is updated (or inserted for a miss) with the 16b signature and 2b mode value.

With its aggressive co-optimization of timeliness, coverage and accuracy of prefetches, all achieved at low storage requirements, the ASAP prefetcher 1207 achieves a significant increase in processor performance over current prefetchers in both industry and academia. One embodiment has been modeled in a cycle accurate research simulator, across a wide variety of workload categories (all of SPEC, a range of client (Sysmark, Apple) and Server (TPCC, Enterprise, workstation) workloads we see an average 2% (and up to 45%) increase in single thread performance over SPP and an average of 4.15% (up to 45%) increase in performance over SMS. Similarly the ASAP prefetcher 1207 provides an average 1.3% increase in multi-thread performance over SPP and a 5.6% increase in multi-thread performance over SMS for SPEC workloads. On average, the prefetching techniques described herein are 0.5% more accurate than SPP (Percentage of fills into L2 by the prefetcher that see subsequent demand hits). With a novel decoupling of patterns and signature, ASAP achieves this performance/accuracy with around 10 KB of storage at the L2.

Figure 17:
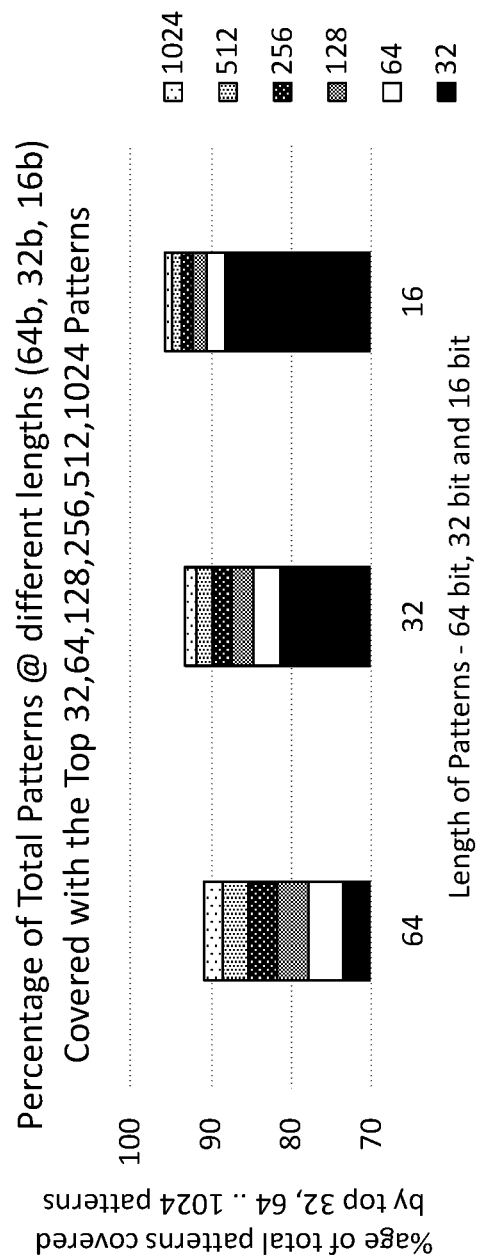
FIG. 17 illustrates a characterization of patterns seen in example workloads.

FIG. 17 illustrates a characterization of patterns seen in example workloads. At a 64b length, 1024 patterns are needed to cover an average 90% of all the patterns seen within a 10 million instruction window. However, a 64b pattern is composed from two 32b patterns, the top 256 32b patterns cover over 90% of all 32b patterns. Similarly, 64 16b patterns cover 90% of all 16b patterns.

Figure 18:
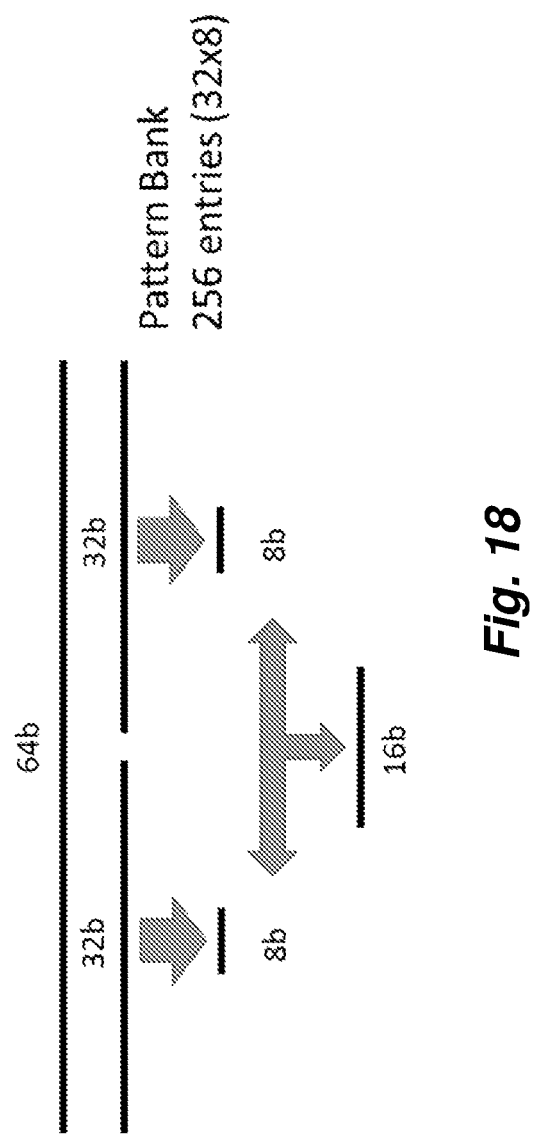
FIG. 18 illustrates one embodiment of a pattern bank.

This insight leads to representing the 64b pattern as two 32b patterns as described above. The top 256 patterns are stored in a 256 entry pattern bank (32 sets/8 way set associative). This allows the 32b pattern to be represented as an 8 bit index, leading to a 75% reduction in storage of patterns as indicated in FIG. 18 (showing a reduction in pattern storage area with a Pattern Bank).

A significant observation here is that performance (Coverage Plus Timeliness) is achieved by triggering prefetches at the earliest possible point (not necessarily the first) and with the simplest signature. Performance is a function of both coverage and timeliness. SMS uses a signature of triggering PC and first offset to predict the spatial access pattern to a page. SPP uses a signature of the last 4 deltas seen in accesses to a page to predict future accesses to a page.

Figure 19:
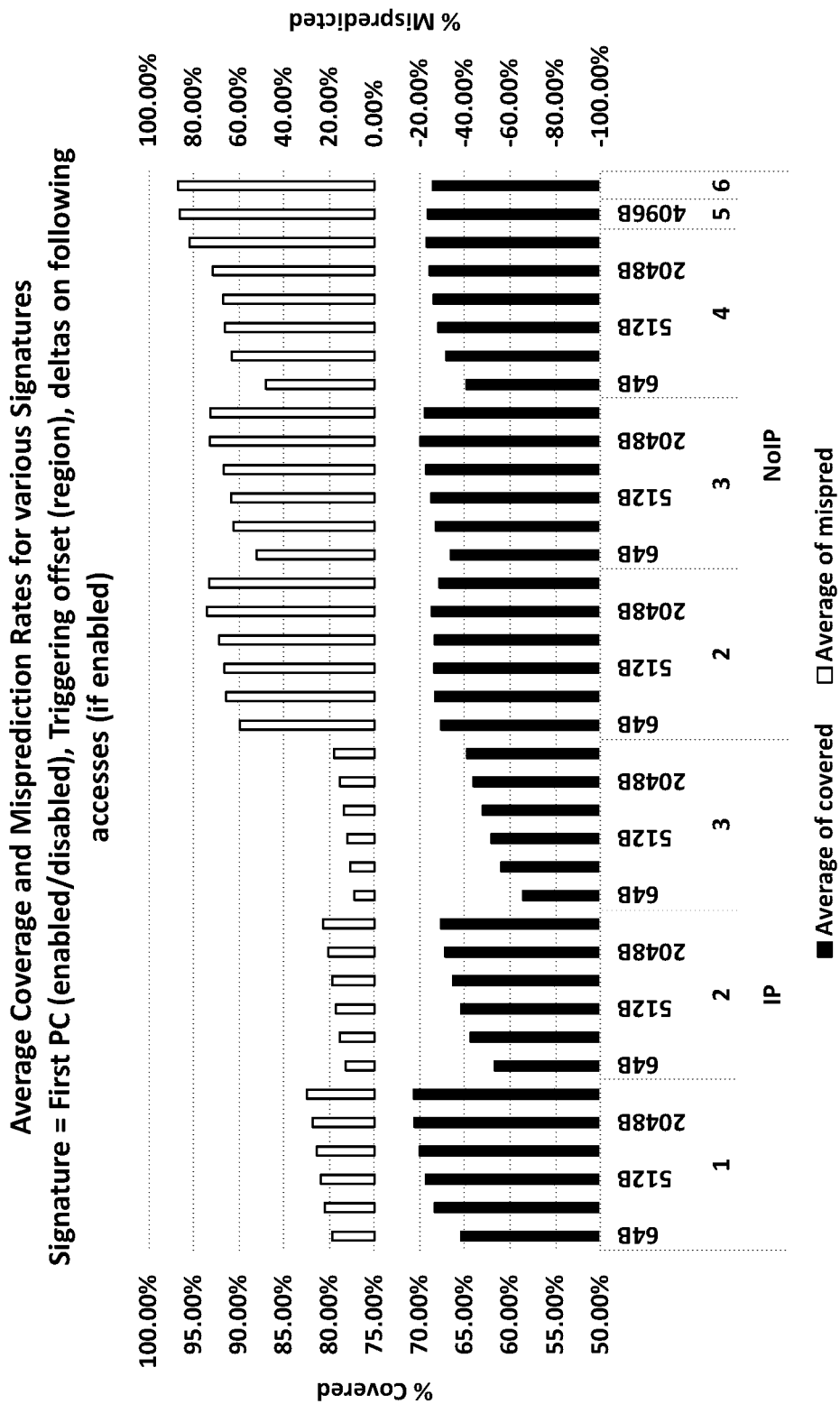
FIGS. 19-24 illustrate data related to resource complexity, timely coverage, and accuracy of prefetch operations.
Figure 20:
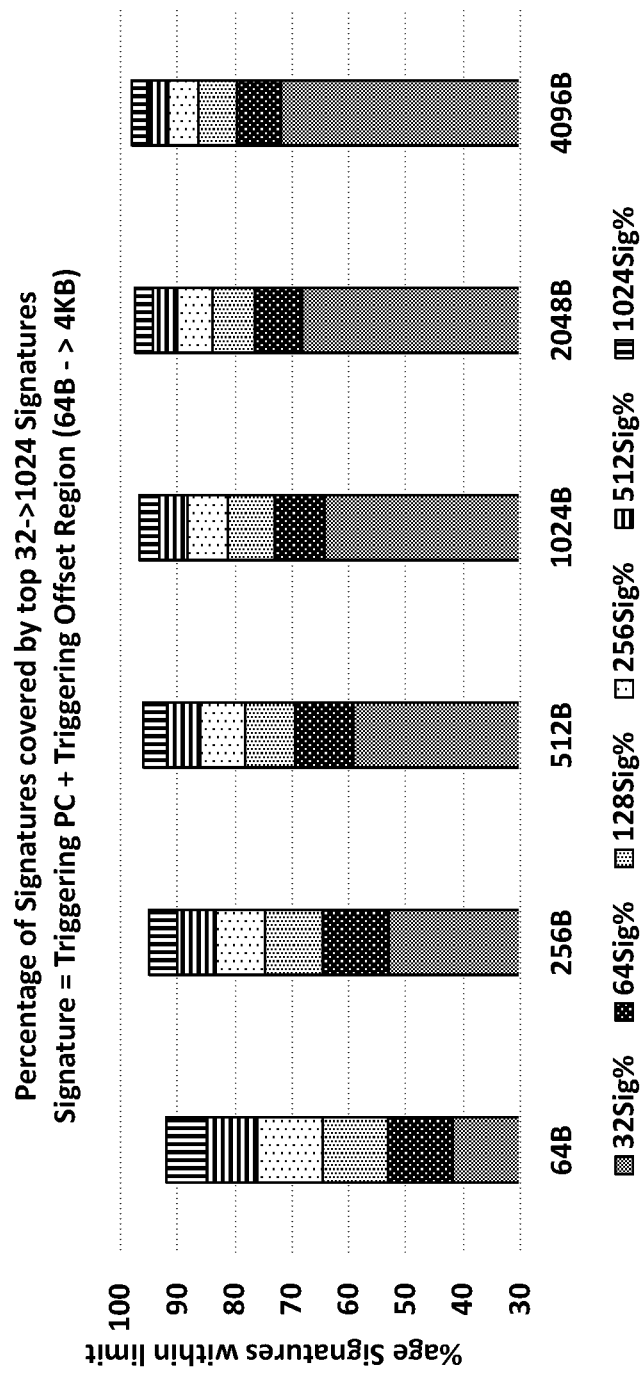

The more complex the signature fewer times it occurs (less coverage) but the better the accuracy. FIG. 19 illustrates this with multiple data points. Using an IP in the signature has higher accuracy but lower coverage. The more accesses used in the signature the lower the coverage and higher the accuracy. The simpler the offset in the signature, the more the coverage. Additionally the more complex a signature, the more signatures that will be encountered which increases storage as shown in FIG. 20.

Figure 21:
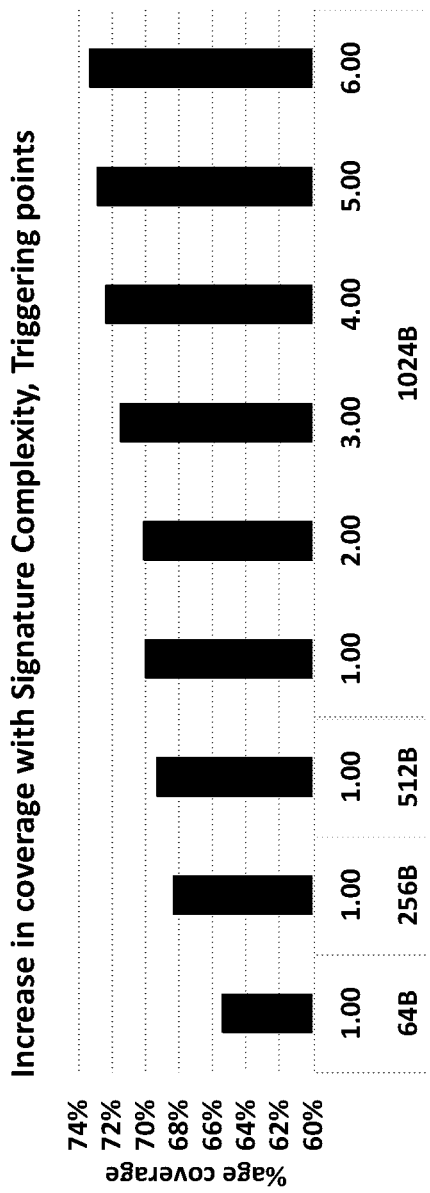

Using multiple trigger points is needed for increased coverage. Triggering prefetches on the first possible access provides maximum timeliness. But if prefetches are not triggered on the first access, there is no mechanism to trigger prefetches on subsequent accesses. FIG. 21 shows cumulative increase in coverage when triggering prefetches from more accesses.

Figure 22:
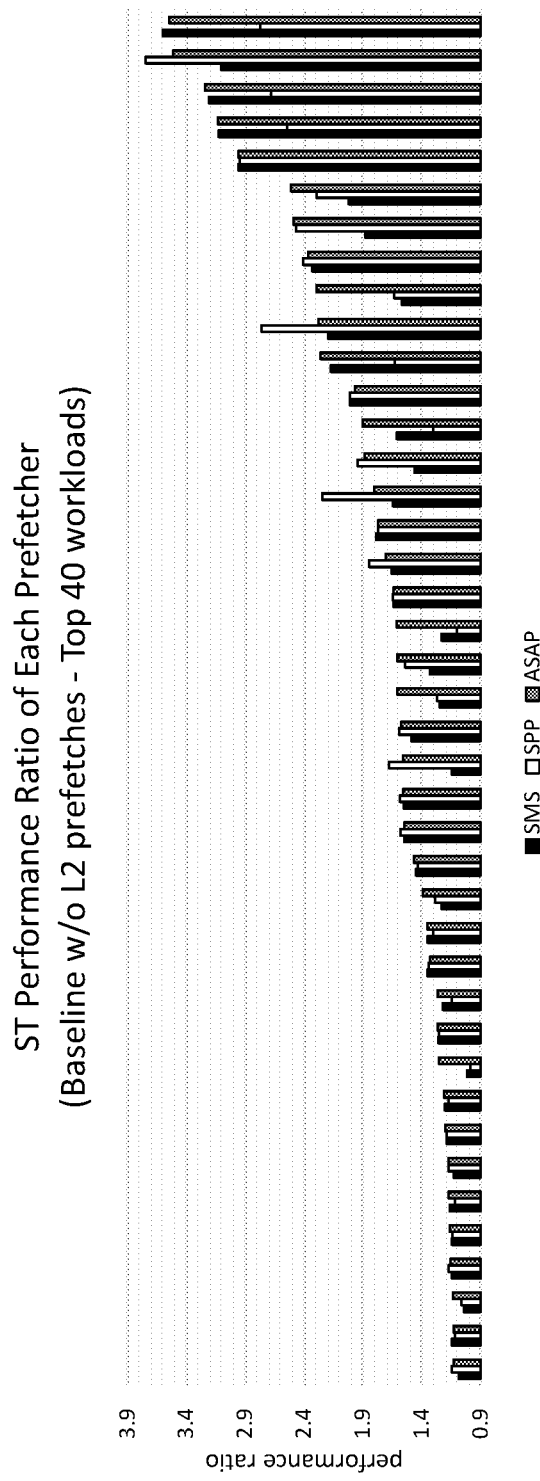
Figure 23:
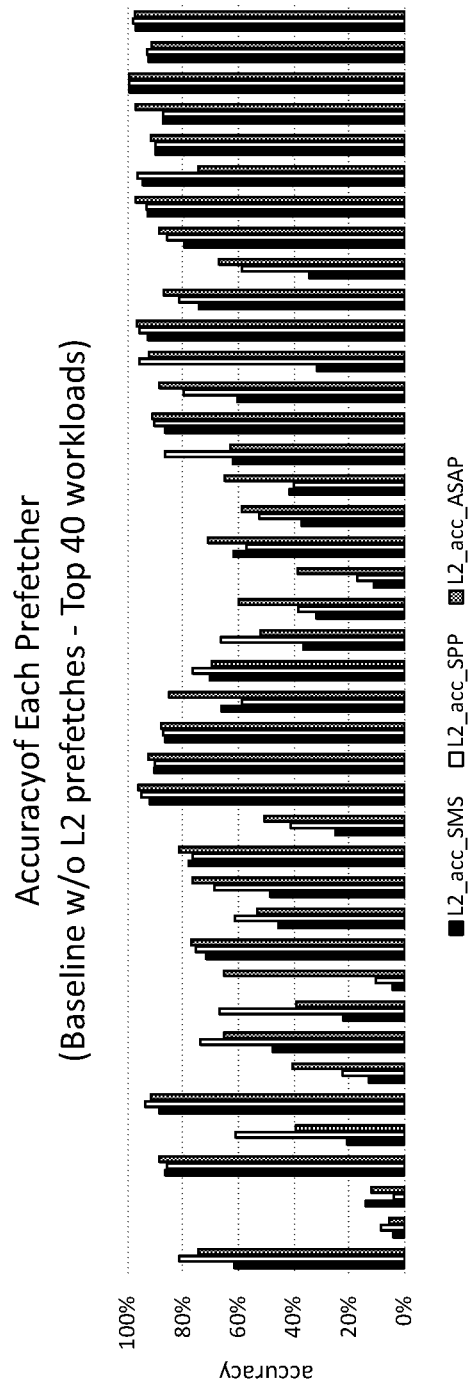
Figure 24:
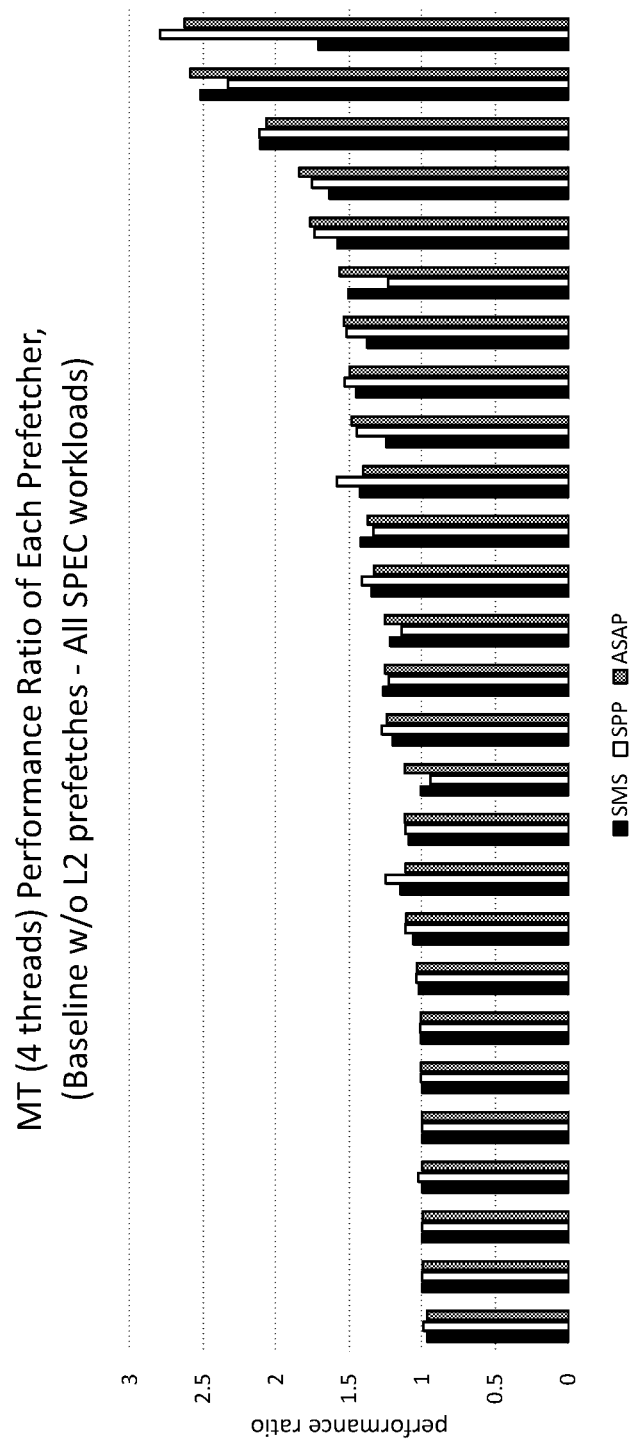

An important observation here is that it may be beneficial to trade coverage for accuracy when coverage is poor. The ASAP prefetcher 1207 described herein meets a balance between coverage and accuracy. When it is possible to be accurate when maintaining high coverage, it is accurate. But it is also able to tradeoff accuracy for increased coverage when coverage is poor. The embodiments of the invention achieve this by judiciously/systematically compressing patterns from a 64B granularity (predicting cachelines) to a 128B granularity (predicting 2 consecutive cachelines; 64b pattern compressed to 32b pattern, again represented by 2*8b pattern bank index) and finally (if needed) a 256B granularity (16b pattern). The signature stores a 2-bit mode to decode the granularity of the prediction. The selection of the granularity of prefetch is based on the pattern bank hit rates in the 64B pattern bank (256 entries) and the 128B pattern bank (256 entries). Further optimizations for this are contemplated for additional embodiments of the invention. Different comparisons of performance and accuracy are graphed in FIGS. 22-24.

Table 1 below illustrates exemplary storage calculations for an implementation of the ASAP prefetcher 1207 described herein. Note that these values are provide merely for the purpose of illustration. The underlying principles of the invention are not limited to these or any specific set of values.

TABLE 1

| Structure | Field | #bits | #entries | Total Bits |
|---|---|---|---|---|
| Pattern Bank_64B | 32b pattern | 32 | 256 | 8192 |
| | LRU | 2 | 256 | 512 |
| Pattern Bank_128B | 32b compressed pattern | 16 | 256 | 4096 |
| | LRU | 2 | 256 | 512 |
| Page Buffer | Page | 16 | 64 | 1024 |
| | Pattern | 64 | 64 | 4096 |
| | IP | 16 | 64 | 1024 |
| | Offset (6 offsets) | 30 | 64 | 1920 |
| Prediction Table (First Access) | Tag | 14 | 256 | 3584 |
| | LRU | 2 | 256 | 512 |
| | Mode | 2 | 256 | 512 |
| | Pattern | 16 | 256 | 4096 |
| Prediction Table (2nd Access) | Tag | 20 | 512 | 10240 |
| | LRU | 2 | 512 | 1024 |
| | Mode | 2 | 512 | 1024 |
| | Pattern | 16 | 512 | 8192 |
| Prediction Table (3rd, 4th, 5th Access) | Tag | 13 | 512 | 6656 |
| | LRU | 2 | 512 | 1024 |
| | Mode | 2 | 512 | 1024 |
| | Pattern | 16 | 512 | 8192 |
| Prediction Table (6th Access) | Tag | 8 | 256 | 2048 |
| | LRU | 2 | 256 | 512 |
| | Mode | 2 | 256 | 512 |
| | Pattern | 16 | 256 | 4096 |

TABLE 1-continued

| Structure | Field | #bits | #entries | Total Bits |
|---|---|---|---|---|
| Prediction Buffer | Page | 6 | 64 | 384 |
| | generated access 64b | 64 | 64 | 4096 |
| | Issued access 64b | 64 | 64 | 4096 |
| | Total Bits | | | 83200 |
| | Total Bytes | | | 10400 |
| | Total KB | | | 10.15625 |

In summary, with an aggressive co-optimization of timeliness, coverage and accuracy of prefetches, all achieved at low storage requirements, embodiments of the invention achieve a significant increase in processor performance over the current state of the art prefetchers.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

EXAMPLES

Example 1

An apparatus comprising: execution circuitry to execute instructions and process data; a Level 2 (L2) cache to store at least a portion of the data; and a prefetcher to prefetch data from a memory subsystem to the L2 cache in anticipation of the data being needed by the execution unit to execute one or more of the instructions, the prefetcher comprising a buffer to store one or more prefetched memory pages or portions thereof, and signature data indicating detected patterns of access to the one or more prefetched memory pages; wherein the prefetcher is to prefetch one or more cache lines based on the signature data.

Example 2

The apparatus of example 1 wherein the signature data comprises, for each page, a triggering instruction pointer and one or more offset values indicating offsets into the pages.

Example 3

The apparatus of example 2 further comprising: a plurality of prediction tables to be indexed by the signature data, wherein each prediction table is associated with a different number of accesses to a page.

Example 4

The apparatus of example 3 wherein for a first access prediction table associated with a first access to the page, the signature data comprises an instruction pointer and an offset into the page and for a second access prediction table associated with a second access to the page, the signature data comprises an instruction pointer, an offset into the page, and a delta between the first access to the page and the second access to the page.

Example 5

The apparatus of example 4 wherein for one or more additional access prediction tables associated with one or more additional accesses to the page, the signature data comprises one or more deltas between page accesses.

Example 6

The apparatus of example 3 wherein the prediction table, responsive to the signature data, is to generate a pattern bank index into a prefetch pattern bank to determine a prefetch pattern to be used by the prefetcher.

Example 7

The apparatus of example 6 further comprising: a plurality of prefetch pattern banks including a first prefetch pattern bank associated with a first granularity to be used for prefetching cache lines and a second prefetch pattern bank associated with a second granularity to be used for prefetching cache lines.

Example 8

The apparatus of example 7 wherein a cache line comprises 64B, the first granularity comprises 64B and the second granularity comprises 128B.

Example 9

A method comprising: prefetching data from a memory subsystem to an L2 cache in anticipation of the data being needed for execution of one or more instructions, storing one or more memory pages or portions thereof associated with prefetch operations; generating signature data indicating detected patterns of access to the one or more prefetched memory pages; and prefetching one or more cache lines based on the signature data.

Example 10

The method of example 9 wherein the signature data comprises, for each page, a triggering instruction pointer and one or more offset values indicating offsets into the pages.

Example 11

The method of example 10 further comprising: indexing into one of a plurality of prediction tables using the signature data, wherein each prediction table is associated with a different number of accesses to a page.

Example 12

The method of example 11 wherein for a first access prediction table associated with a first access to the page, the signature data comprises an instruction pointer and an offset into the page and for a second access prediction table associated with a second access to the page, the signature data comprises an instruction pointer, an offset into the page, and a delta between the first access to the page and the second access to the page.

Example 13

The method of example 12 wherein for one or more additional access prediction tables associated with one or more additional accesses to the page, the signature data comprises one or more deltas between page accesses.

Example 14

The method of example 12 wherein the prediction table, responsive to the signature data, is to generate a pattern bank index into one or more prefetch pattern banks to determine a prefetch pattern to be used by the prefetcher, the method comprising: using the prefetch pattern to perform additional prefetch operations.

Example 15

The method of example 14 wherein the prefetch pattern banks include a first prefetch pattern bank associated with a first granularity to be used for prefetching cache lines and a second prefetch pattern bank associated with a second granularity to be used for prefetching cache lines.

Example 16

The method of example 15 wherein a cache line comprises 64B, the first granularity comprises 64B and the second granularity comprises 128B.

Example 17

A machine-readable medium having program code stored thereon which, when executed by a machine, causes the machine to perform the operations of: prefetching data from a memory subsystem to an L2 cache in anticipation of the data being needed for execution of one or more instructions, storing one or more memory pages or portions thereof associated with prefetch operations; generating signature data indicating detected patterns of access to the one or more prefetched memory pages; and prefetching one or more cache lines based on the signature data.

Example 18

The machine-readable medium of example 17 wherein the signature data comprises, for each page, a triggering instruction pointer and one or more offset values indicating offsets into the pages.

Example 19

The machine-readable medium of example 18 further comprising: indexing into one of a plurality of prediction tables using the signature data, wherein each prediction table is associated with a different number of accesses to a page.

Example 20

The machine-readable medium of example 19 wherein for a first access prediction table associated with a first access to the page, the signature data comprises an instruction pointer and an offset into the page and for a second access prediction table associated with a second access to the page, the signature data comprises an instruction pointer, an offset into the page, and a delta between the first access to the page and the second access to the page.

Example 21

The machine-readable medium of example 20 wherein for one or more additional access prediction tables associated with one or more additional accesses to the page, the signature data comprises one or more deltas between page accesses.

Example 22

The machine-readable medium of example 20 wherein the prediction table, responsive to the signature data, is to generate a pattern bank index into one or more prefetch pattern banks to determine a prefetch pattern to be used by the prefetcher, the machine-readable medium including additional program code to cause the machine to perform the operations of: using the prefetch pattern to perform additional prefetch operations.

Example 23

The method of example 22 wherein the prefetch pattern banks include a first prefetch pattern bank associated with a first granularity to be used for prefetching cache lines and a second prefetch pattern bank associated with a second granularity to be used for prefetching cache lines.

Example 24

The method of example 23 wherein a cache line comprises 64B, the first granularity comprises 64B and the second granularity comprises 128B.

What is claimed is:

1. An apparatus comprising:
execution circuitry to execute instructions and process data;
a Level 2 (L2) cache to store at least a portion of the data;
a prefetcher to prefetch data from a memory subsystem to the L2 cache in anticipation of the data being needed by the execution circuitry to execute one or more of the instructions, the prefetcher comprising a buffer to store one or more prefetched memory pages or portions thereof, and signature data indicating detected patterns of access to the one or more prefetched memory pages; and
a plurality of prediction tables to be indexed by the signature data, each prediction table associated with a different number of accesses to a memory page;
wherein the prefetcher is to prefetch one or more cache lines based on the signature data; and
wherein the prediction table, responsive to the signature data, is to generate a pattern bank index into a prefetch pattern bank to determine a prefetch pattern to be used by the prefetcher.

2. The apparatus of claim 1 wherein the signature data comprises, for each page, a triggering instruction pointer and one or more offset values indicating offsets into the pages.

3. The apparatus of claim 2 wherein for a first access prediction table associated with a first access to the page, the signature data comprises an instruction pointer and an offset into the page and for a second access prediction table associated with a second access to the page, the signature data comprises an instruction pointer, an offset into the page, and a delta between the first access to the page and the second access to the page.

4. The apparatus of claim 3 wherein for one or more additional access prediction tables associated with one or more additional accesses to the page, the signature data comprises one or more deltas between page accesses.

5. The apparatus of claim 2 further comprising:
a plurality of prefetch pattern banks including a first prefetch pattern bank associated with a first granularity to be used for prefetching cache lines and a second prefetch pattern bank associated with a second granularity to be used for prefetching cache lines.

6. The apparatus of claim 5 wherein a cache line comprises 64B, the first granularity comprises 64B and the second granularity comprises 128B.

7. A method comprising:
prefetching data from a memory subsystem to an L2 cache in anticipation of the data being needed for execution of one or more instructions,
storing one or more prefetched memory pages or portions thereof associated with prefetch operations;
generating signature data indicating detected patterns of access to the one or more prefetched memory pages;

prefetching one or more cache lines based on the signature data;

indexing into one of a plurality of prediction tables using the signature data, each prediction table associated with a different number of accesses to a page, wherein the prediction table, responsive to the signature data, is to generate a pattern bank index into one or more prefetch pattern banks to determine a prefetch pattern; and using the prefetch pattern to perform additional prefetch operations.

8. The method of claim 7 wherein the signature data comprises, for each page, a triggering instruction pointer and one or more offset values indicating offsets into the pages.

9. The method of claim 8 wherein for a first access prediction table associated with a first access to the page, the signature data comprises an instruction pointer and an offset into the page and for a second access prediction table associated with a second access to the page, the signature data comprises an instruction pointer, an offset into the page, and a delta between the first access to the page and the second access to the page.

10. The method of claim 9 wherein for one or more additional access prediction tables associated with one or more additional accesses to the page, the signature data comprises one or more deltas between page accesses.

11. The method of claim 8 wherein the prefetch pattern banks include a first prefetch pattern bank associated with a first granularity to be used for prefetching cache lines and a second prefetch pattern bank associated with a second granularity to be used for prefetching cache lines.

12. The method of claim 11 wherein a cache line comprises 64B, the first granularity comprises 64B and the second granularity comprises 128B.

13. A non-transitory machine-readable medium having program code stored thereon which, when executed by a machine, causes the machine to perform operations of:

prefetching data from a memory subsystem to an L2 cache in anticipation of the data being needed for execution of one or more instructions, storing one or prefetched more memory pages or portions thereof associated with prefetch operations;

generating signature data indicating detected patterns of access to the one or more prefetched memory pages;

prefetching one or more cache lines based on the signature data;

indexing into one of a plurality of prediction tables using the signature data, each prediction table associated with a different number of accesses to a page, wherein the prediction table, responsive to the signature data, is to generate a pattern bank index into one or more prefetch pattern banks to determine a prefetch pattern; and using the prefetch pattern to perform additional prefetch operations.

14. The non-transitory machine-readable medium of claim 13 wherein the signature data comprises, for each page, a triggering instruction pointer and one or more offset values indicating offsets into the pages.

15. The non-transitory machine-readable medium of claim 14 wherein for a first access prediction table associated with a first access to the page, the signature data comprises an instruction pointer and an offset into the page and for a second access prediction table associated with a second access to the page, the signature data comprises an instruction pointer, an offset into the page, and a delta between the first access to the page and the second access to the page.

16. The non-transitory machine-readable medium of claim 15 wherein for one or more additional access prediction tables associated with one or more additional accesses to the page, the signature data comprises one or more deltas between page accesses.

17. The non-transitory machine-readable medium of claim 14 wherein the prefetch pattern banks include a first prefetch pattern bank associated with a first granularity to be used for prefetching cache lines and a second prefetch pattern bank associated with a second granularity to be used for prefetching cache lines.

18. The non-transitory machine-readable medium of claim 17 wherein a cache line comprises 64B, the first granularity comprises 64B and the second granularity comprises 128B.

* * * * *